United States Patent [19]
Darda

[11] 3,812,933
[45] May 28, 1974

[54] ENERGY STORING DRIVE MEANS
[76] Inventor: Helmut Darda, Im Tal, 7712 Blumberg, Germany
[22] Filed: Apr. 20, 1971
[21] Appl. No.: 135,662

[30] Foreign Application Priority Data
Apr. 21, 1970 Germany............................ 2019085
Aug. 7, 1970 Germany............................ 2039265

[52] U.S. Cl. ..................................... 185/37, 46/206
[51] Int. Cl. ............................................. F03g 1/00
[58] Field of Search ............. 185/37, 39, 45; 46/206

[56] References Cited
UNITED STATES PATENTS
2,182,529  12/1939  Wyrick ............................... 185/39
3,216,529  11/1965  Lohr .................................. 185/37 X
3,393,771   7/1968  Lohr et al. ......................... 185/39 X FOREIGN PATENTS OR APPLICATIONS
1,192,330   5/1970  Great Britain ...................... 184/37

Primary Examiner—Manuel A. Antonakas
Attorney, Agent, or Firm—Michael S. Striker

[57] ABSTRACT

A first component in a drive is rotatable in one and in an opposite direction. A second component, such as a shaft, is rotatable also, and is connected with energy storing means which stores energy when the second component rotates. A transmission is provided which connects the first and second components to rotate the second when the first rotates. The transmission has a first branch provided with a first device which transmits motion from the first component to the second component only when the first component rotates in one direction but will not transmit such motion when this first component rotates in the opposite direction, and there is further provided in the transmission a second branch having a second device which transmits motion to the second component only when the first component rotates in the opposite direction but will not transmit motion when the first component rotates in the first direction.

38 Claims, 42 Drawing Figures

Fig. 1
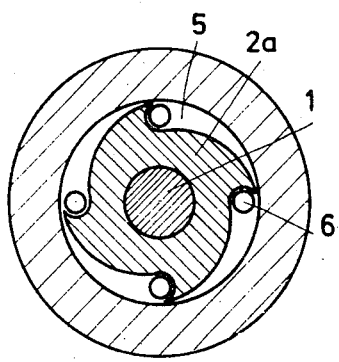
Fig. 1b
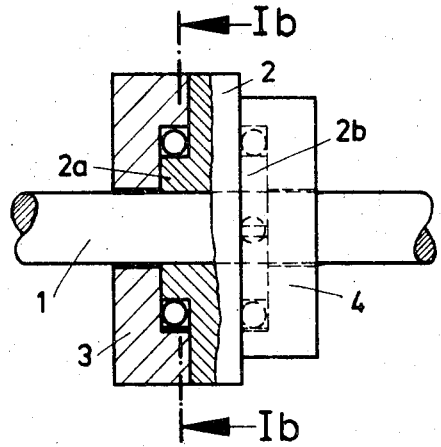
Fig. 1a
Fig. 2
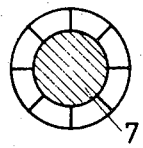
Fig. 2b
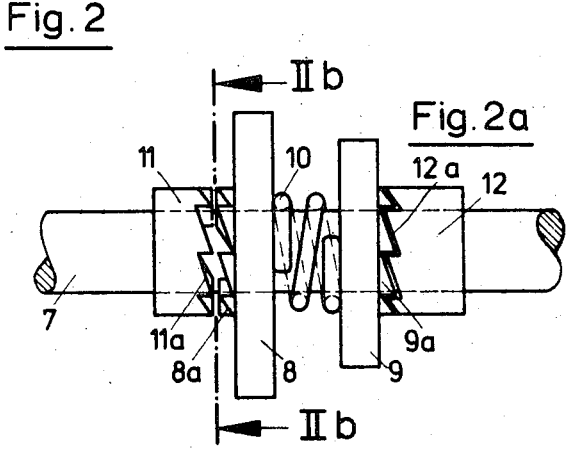
Fig. 2a Fig. 3
Fig. 3b
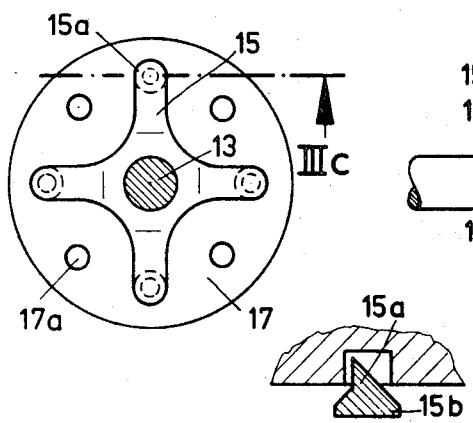
Fig. 3a
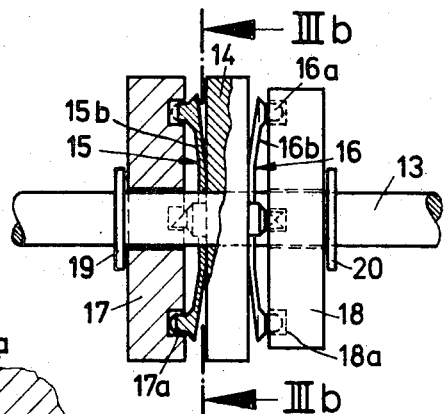
Fig. 3c
Fig. 4
Fig. 4b
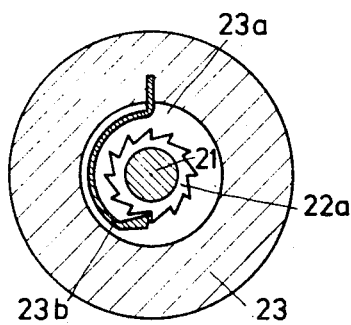
Fig. 4a
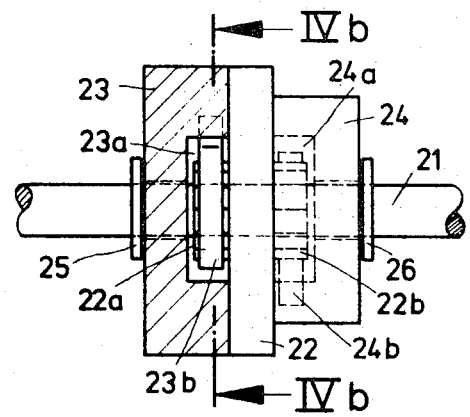

Fig. 5
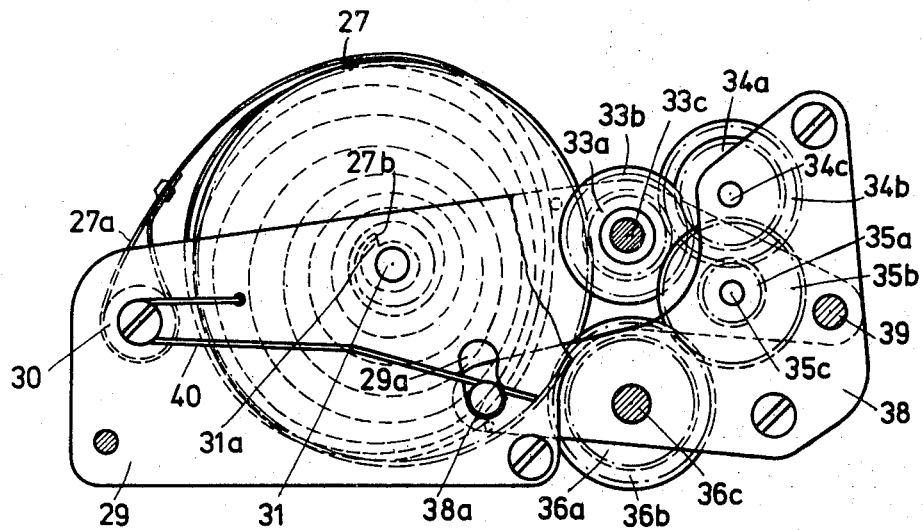
Fig. 5a
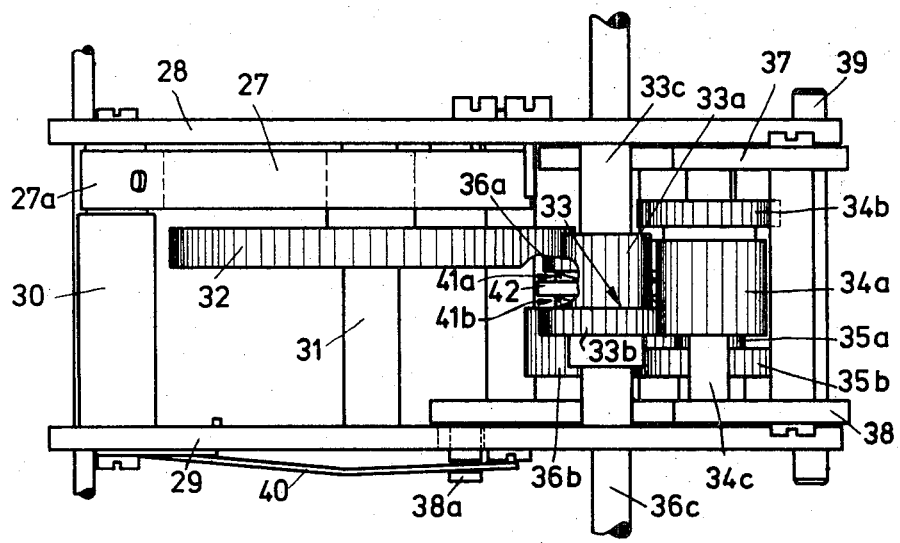
Fig. 5b

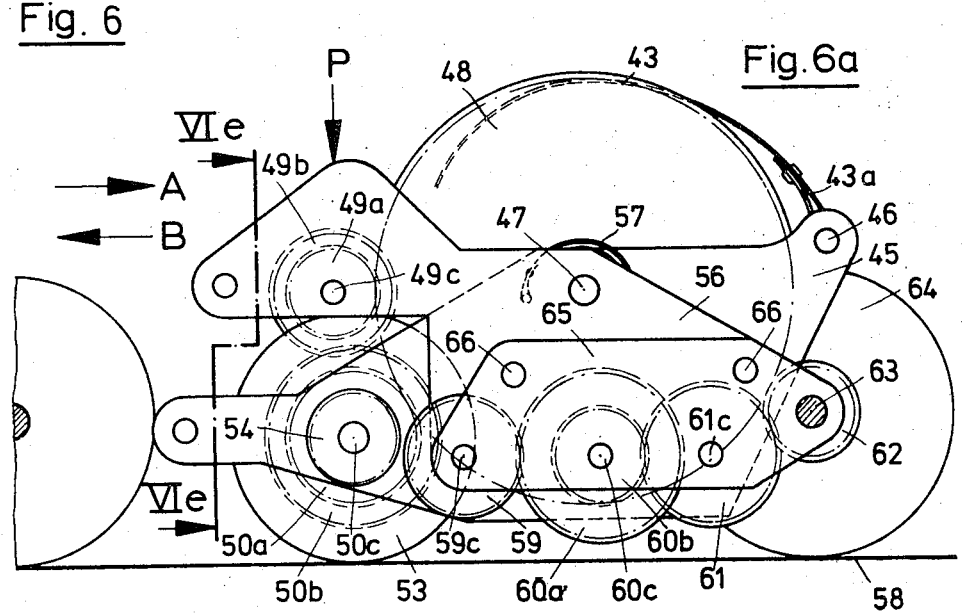
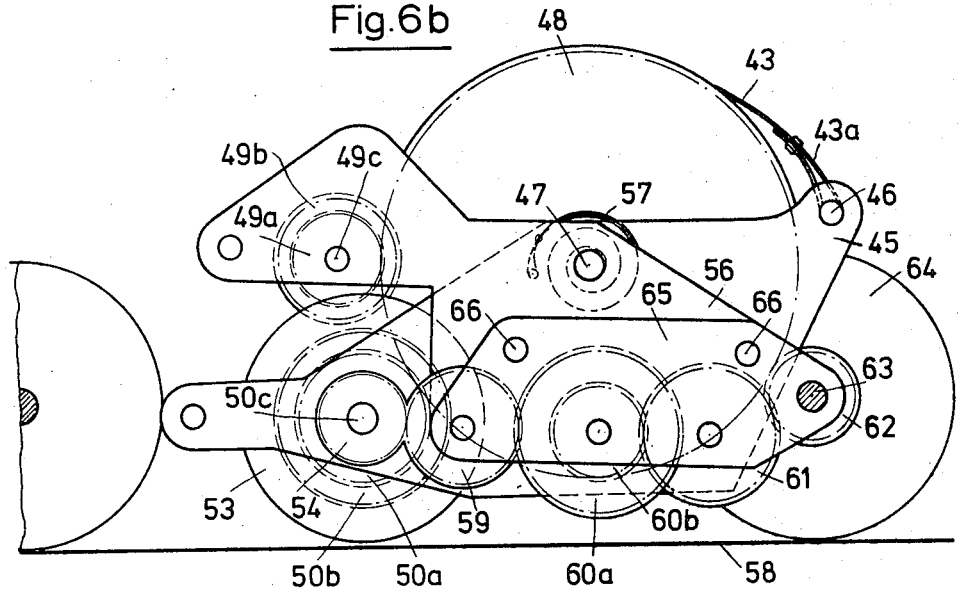

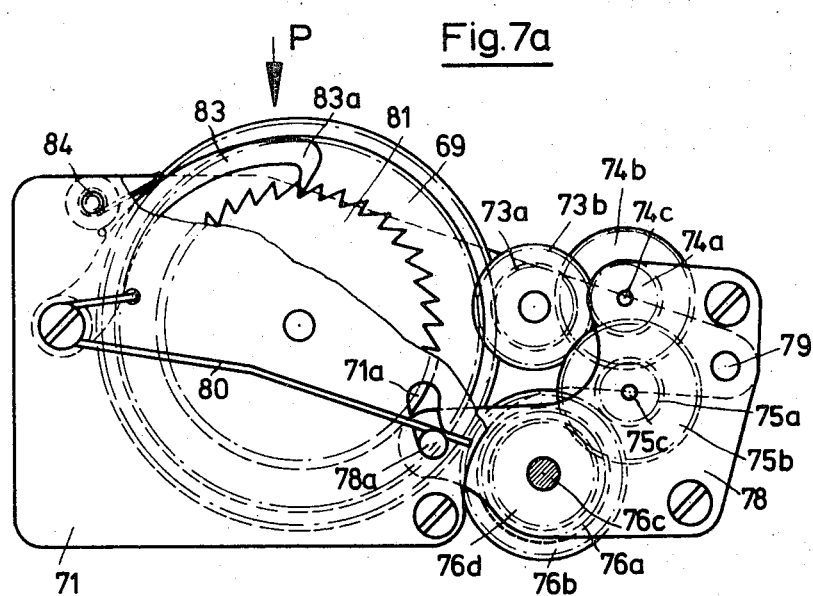
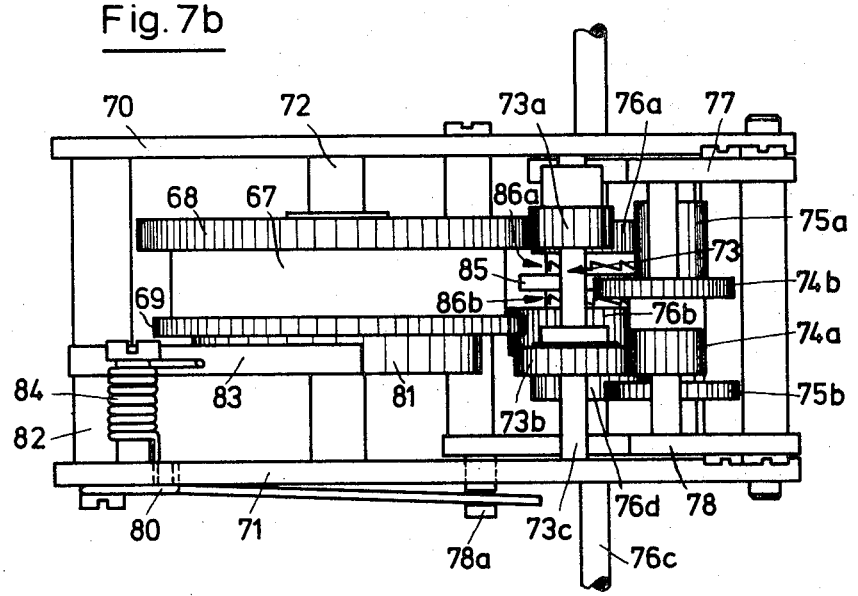

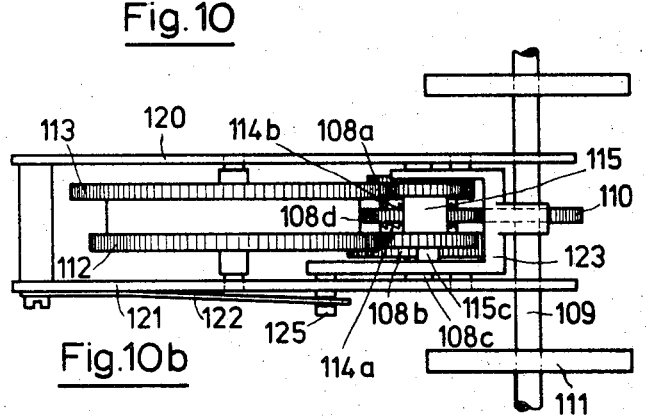
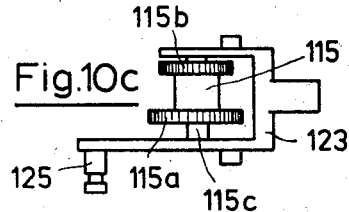
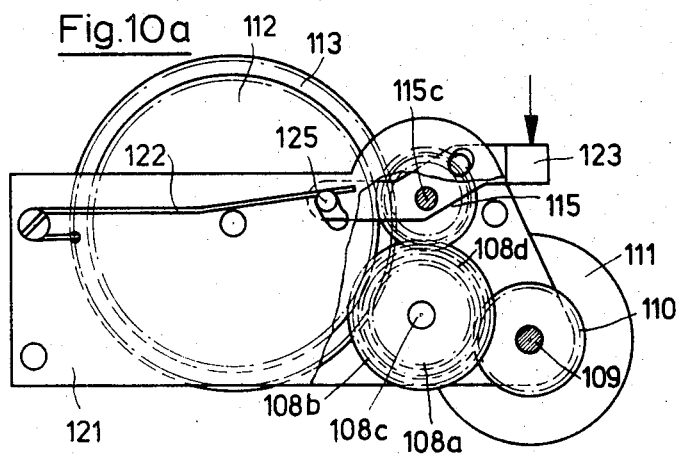

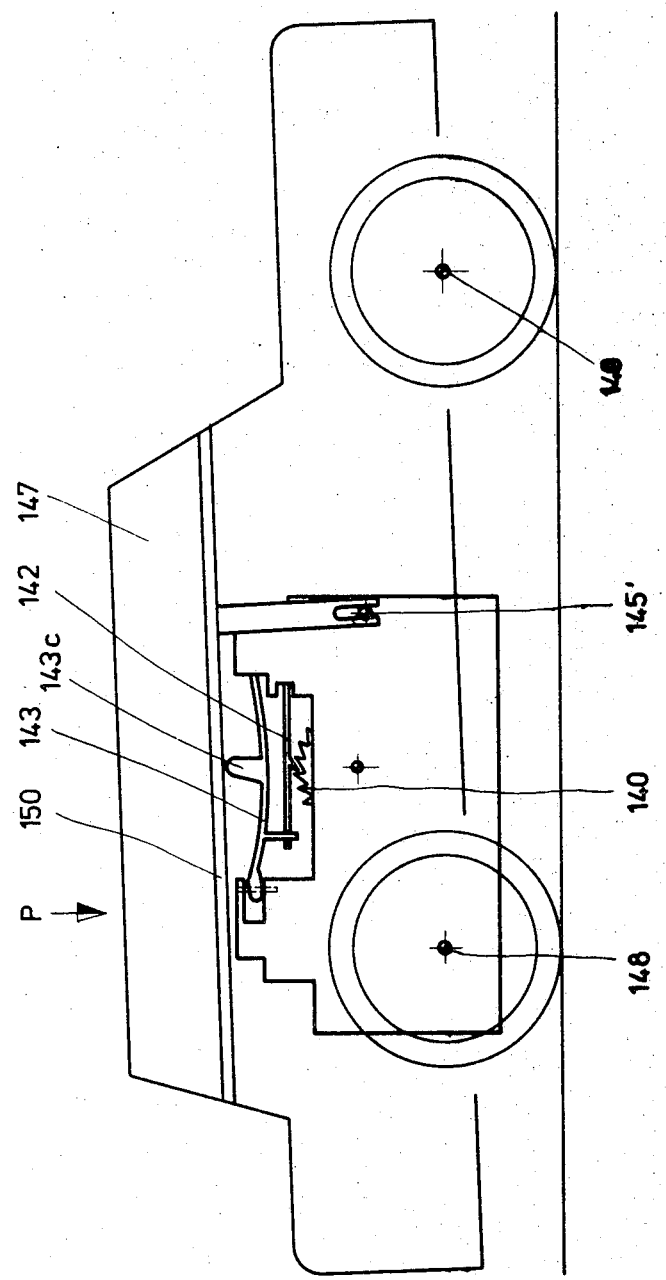

ENERGY STORING DRIVE MEANS

BACKGROUND OF THE INVENTION

The present invention relates generally to a drive, and more particularly to a drive utilizing an energy-storing means. Still more particularly the present invention relates to a spring drive which is especially suited for mobile toys.

Spring drives used for mobile toys and similar purposes generally employ a spiral spring whose inner end is connected with a rotary shaft and whose outer end is connected with the output shaft of the drive via a transmission. A key is provided which engages with the spring shaft and turns the latter, thereby tensioning the spring and storing energy in the same. In such construction the transmission and the outer end of the spring must be arrested to prevent immediate dissipation of the energy input at the spring shaft.

This type of construction is very widely used, and in many instances is entirely satisfactory. However, it has been found that small and very small children are incapable of winding such spring drives by means of the key provided, sometimes because they do not understand the reasons for the use of the key, sometimes because they have inadequate strength or coordination to use the key. It has been observed that such children frequently attempt to wind the spring not by means of the key, but by turning the spring shaft itself or even the output shaft of the drive. In any case, the keys in such spring drives are usually components which are discrete from the remainder of the drive and which are quite often lost, at which point it is impossible to further utilize the drive except in the unlikely event that the user should have or be able to obtain a key which can replace the one that has been lost.

An additional drawback of these prior-art devices is the fact that the transmission which is interposed between the spring and output shaft makes the winding of the spring relatively time-consuming and tiring for a small child, aside from the fact that there exists the danger that turning of the key in the wrong direction —it is well known that there is only one direction in which the key must be turned to wind the spring— the spring may be damaged, a danger which also exists from possible over-tightening of the spring.

Attempts have been made to overcome these difficulties. Thus, spring drives are known from the art in which the spring is tensioned by means of a friction wheel connected with the spring shaft and which rotates the spring shaft when the toy or other element in which the spring drive is incorporated, is pressed down so that the friction wheel contacts a surface on which the toy is then moved along to turn the friction wheel and thereby wind the spring. Other embodiments of the prior art prefer to utilize auxiliary gears which are placed in mesh with the spring shaft and the output shaft when the toy is pressed down onto a surface and is then moved along the surface.

However, in these as in all other well-known spring drives which avoid the use of a key for winding the spring, the output shaft must be turned only in one predetermined direction for tensioning the spring, so that the spring is tensioned only if the toy vehicle or the like is moved over a support surface in a given direction. This is disadvantageous because it presupposes that a playing child understands that the spring can be tensioned only by moving the toy in this one direction, a degree of perception which is absent in small children who, it has been observed, invariably attempt to wind the spring by moving the toy not only in one direction but back and forth in mutually opposite directions.

SUMMARY OF THE INVENTION

It is a general object of the present invention to overcome the disadvantages of the prior art.

More particularly it is an object of the present invention to provide an improved drive of the type under discussion which is not possessed of these disadvantages.

A still more particular object of the invention is to provide such a drive in which the energy storing means —whether it be a spring of the coil or spiral type, a helical spring, a torsion spring which may or may not consist of rubber, or a similar energy storing means all of which can be utilized in accordance with the present invention— can be wound by moving the drive in mutually opposite directions, that is that the component transmitting motion to the energy storing device can be rotated in mutually opposite directions and will in both directions effect the storage of energy.

A concomitant object of the invention is to provide such a construction in which the energy storing means is so arranged that it will store energy as a result of the rotation of either the output shaft of the drive or else by means of a separate input shaft, for instance an auxiliary friction wheel mounted on such a shaft.

In pursuance of the above objects, and of others which will become apparent hereafter, one feature of the invention resides in a drive, particularly but not exclusively for mobile toys, which comprises a first component rotatable in one and in an opposite direction, and a second component which is rotatable in a predetermined direction. Energy storing means is connected with the second component and adapted to store energy in response to rotation thereof in the aforementioned predetermined direction.

Transmission means is associated with these components for effecting rotation of the second component in the aforementioned predetermined direction; it comprises a first branch including first means adapted to link the components for transmission of motion to the second component only in response to rotation of the first component in one direction, and a second branch including second means which is adapted to link the components for transmission of motion to the second component only in response to rotation of the first component in the opposite direction.

The basic concept according to the present invention can be utilized for drives in which a spring is provided only one end of which is connected with the second component —that is the spring shaft or a spring gear wheel— whereas the other end is fixed for instance on a supporting frame or the like. In this case, it is necessary that between the spring gear wheel and the output shaft or the separate input shaft there be provided a power train or transmission train having an even number of gears and a second power or transmission train having an uneven number of gears, the first means being located in one and the second being located in the other gear train. These means serve to interrupt transmission through one gear train when motion is transmitted through the other, and vice versa. The differential number of gears provides for the transmission of an energy-storing component of movement when the input or output shaft is turned towards the right, via one of the transmission trains, whereas the other transmission train transmits motion when the input or output shaft is turned towards the left.

If, on the other hand, both ends of the spring are each connected with a gear wheel, then two transmission trains or branches can be provided each of which connects one of the gear wheels with the output shaft or the separate input shaft, and again with the first and second means being respectively located in these gear trains. One of these means then will arrest an associated spring end for one direction of rotation during tensioning of the spring, so that depending on the direction of rotation of the first component —that is either the output shaft or the separate input shaft— the spring will be alternately tensioned from one end or from the other end. Blocking gears may be provided on the spring shaft and on a spring housing, having oppositely directed gear teeth which can be clocked in different directions of rotation by means of spring loaded pawls or the like.

For purposes of convenience the aforementioned first and second means will hereafter be designated as "one-way devices" or a "first one-way device" and a "second one-way device."

The blocking arrangement just pointed out above can be omitted if a direction-reversing pinion is mounted between the two branches or trains of the transmission in such a manner that the two gear wheels respectively connected with the opposite ends of the spring are each turned in one direction but mutually opposite to each other, upon turning of the input or output shaft in the one and the opposite direction. Advantageously the direction-reversing pinion will be located and in mesh with the one gear wheel and an additional pinion which is in mesh with the other gear wheel. In such an arrangment it is possible to always tension the spring from both ends, irrespective of the direction of rotation of the input or output shaft.

If a spring is utilized which is fast for instance with a supporting frame at one end and at the other end is connected with a spring gear wheel, then the invention proposes to utlize in addition to the normal output transmission which is in driving connection with the output shaft, an additional input transmission. In this case the output transmission is to be connected in driving relation with one of the gear wheels only when the spring is to be allowed to dissipate or release stored energy, and biasing means is provided which permanently tends to disconnect the output transmission from this one gear wheel.

It is also possible to utilize a construction in which both ends of a spring are connected with gear wheels so that the spring can be rapidly wound from both opposite ends. In such a case one of the two gear wheels is combined with a blocking wheel which can be arrested with a blocking pawl during energy dissipation from the spring, and which blocking pawl is inoperative when the spring is being wound. In such a construction the spring is tensioned from its two opposite ends independently of the direction of rotation of the input or output shaft, but it dissipates energy and drives the output transmission only from one of the spring ends so that the output transmission can be constructed as a normal step-up transmission.

In constructions where greater simplicity and/or lesser construction cost are of importance, the drive according to the present invention may be constructed analogously to the manner of a differential drive, in which case the output transmission and the input transmission can be combined with one another. In such a construction the output shaft is provided with two pinions having differential numbers of teeth which are connected with one another against relative rotation, and which in turn are in mesh with the differentially-dimensioned gear wheels for the spring. In this case energy dissipation produces two oppositely directed torques which are so superimposed by means of the transmission that the smaller differential moment will appear at the output shaft.

To permit tensioning of the spring both from the inner and from the outer end thereof, the invention requires the provision of two one-way drives according to the present invention which are operative in opposite directions, in such a manner that the spring can be wound from its inner and/or its outer end —depending upon the direction of rotation— by turning of a single shaft towards the right or towards the left. In this case either the respectively opposite end of the spring must be arrested, or a reversing pinion must be provided between the two branches of the transmission.

If the reversing pinion is composed of two identically sized rigidly connected gears, then advantageously it may be located between the larger of the two gear wheels and the larger of the two additional pinions which cam with the gear wheels. If the gears of the reversing pinion are of differential size, then it is also possible to locate the reversing pinion between the smaller of the two gear wheels and the smaller of the two additional pinions which cam with the same. In both arrangements the spring may be tensioned simultaneously from both ends, independently of the direction of rotation of the output shaft which connects the additional pinions via the one-way devices according to the present invention.

The operation of this arrangement is based upon the fact that by turning the pinion shaft in one direction one of the two additional pinions will be turned along via the associated one-way device, and will directly turn one of the gear wheels and indirectly —via the other pinion— the other gear wheel. The direction-reversing pinion provides in this case the necessary reversal of rotation. This construction makes the structure and assembly of the drive not only substantially simpler and stronger, but it is also possible to wind the spring in half the time than otherwise because it is wound simultaneously from both of its ends.

A separate arresting device in this construction is unnecessary because the reversing pinion will block the drive, if it is in mesh with one of the additional pinions as well as with the associated gear wheel. In order to unblock the drive and to permit energy dissipation by the spring, the mesh of the reversing pinion with either the associated gear wheel or the associated additional pinion is simply to be released. The reversing pinion can idle with one of the associated gears or gear wheels, when the spring dissipates energy.

If, in accordance with one concept of the invention, the novel drive is to be intended for driving a mobile toy, for instance a toy vehicle, then it is advantageous to so mount the drive that it can be pivoted with respect to the vehicle shell or body about an axis which preferably extends in parallelism with the axis of the vehicle wheels, so that when downward pressure is exerted upon the shell the input transmission is placed into mesh with one or both of the gear wheels as well as with the input or output shaft —depending upon whether the spring is to be tensioned by turning of the output shaft or by turning of a separate input shaft— and simultaneously disengaging the output transmission. If a differential transmission is utilized, it is simply necessary to activate the blocking device which arrests the spring ends or to place the reversing pinion into mesh with the asociated elements. A toy vehicle provided with the novel spring drive can be wound up in very simple manner, merely by lightly pushing the toy against a surface on which it rests and moving it back and forth on this surface.

It is clear, of course, that the spring can be tensioned not only by turning the wheels when the toy vehicle is moved on a support, but instead by turning a separately provided friction wheel which is placed into frictional engagement with the surface when the pressure in downward direction is exerted upon the toy vehicle. The provision of a separate input shaft, that is separately from the output shaft, is for instance advisable if the output shaft and especially the wheels are of relatively weak construction, or if the wheels are relatively heavily sprung with respect to the vehicle chassis. In some circumstances it may generally be of advantage if the actual output shaft is not identical with the pinion shaft, and in this case an additional transmission of the step-up type or of the differential type may be provided between these shafts.

According to a further embodiment of the invention the reversing pinion may also be provided with annuli of teeth which are so differently dimensioned that the force required for tensioning the spring will be identical upon rotation of the output or input shaft in both directions, or that a more rapid tensioning of the spring is possible —utilizing a greater torque— when the respective shaft is turned in one direction than in the other. In the latter case it is advantageous that the gear wheel driven by the reversing pinion is made fast with a gear smaller than the gear wheel itself, with which the correspondingly larger-dimensioned annulus of teeth of the reversing pinion engages when the spring is being tensioned.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1a is a partially sectioned side view of a one-way drive according to one embodiment of the invention;

FIG. 1b is a section on line Ib—Ib of FIG. 1a;

FIG. 2 is a view similar to FIG. 1 but illustrating a second embodiment of the invention;

FIG. 2b is a section taken on line IIb—IIb of FIG. 2a;

FIG. 3a is a view similar to FIG. 1a but illustrating a third embodiment of the invention;

FIG. 3b is a section on line IIIb—IIIb of FIG. 3a;

FIG. 3c is an enlarged fragmentary section on line IIIc of FIG. 3b;

FIG. 4a is a view similar to FIG. 1a illustrating a fourth embodiment of the invention;

FIG. 4b is a section on line IVb—IVb of FIG. 4a;

FIG. 5a illustrates in a partially broken away side view a first embodiment of a spring drive according to the present invention, being illustrated during energy dissipation;

FIG. 5b is a top view of FIG. 5a;

FIG. 6a is a view similar to FIG. 5a illustrating a second embodiment of the spring drive during energy storage;

FIG. 6b is a view similar to FIG. 6a but showing the embodiment during energy dissipation;

FIG. 6c is a top view of FIG. 6a;

FIG. 6e is a front view of FIG. 6a as seen on line VIe—VIe of FIG. 6a;

FIG. 7a is a partially broken away side view of a third embodiment of the novel spring drive during energy dissipation;

FIG. 7b is a top view of FIG. 7a;

FIG. 8c is a plan view of FIG. 8a;

FIG. 9b is a top view of FIG. 9a;

FIG. 10a is a partially broken-away side view of a sixth embodiment of the invention in energy-storing condition;

FIG. 10b is a top view of FIG. 10a;

FIG. 10c is a top view of a bifurcated member with the reversing pinion in the arrangement of FIGS. 10a and 10b;

FIG. 11 is a partially broken away side view of a seventh spring drive arrangement according to the invention, showing energy dissipating condition;

FIG. 11b is a bottom view of FIG. 11a;

FIG. 11d is a section taken on line XId—XId of FIG. 11a;

FIG. 11e is a side view of a toy automobile in diagrammatic showing, provided with the spring drive of FIGS. 11a—11d;

FIG. 12c is a bottom view of FIG. 12a;

FIG. 12d is a section on line XII—XII of FIG. 12b illustrating the gears in mesh.

DESCRIPTION OF THE PREFERRED EMBODIMENTS

Figure 5C:
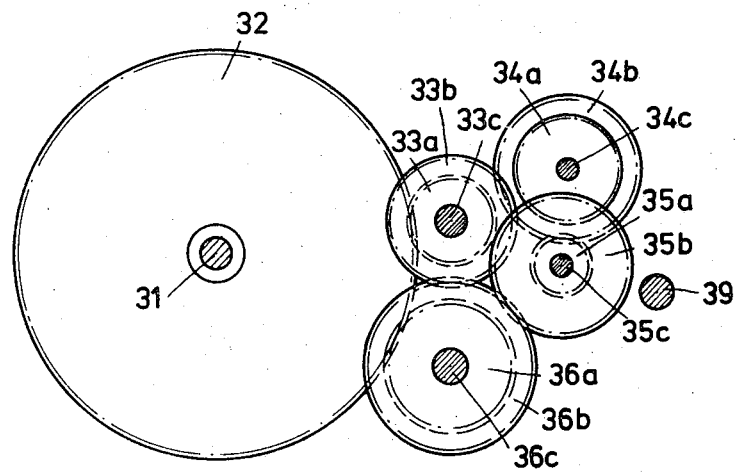
FIG. 5c is a simplified diagrammatic side view of the gears of FIG. 5a during storage of energy.

Before entering into a detailed discussion of the various Figures it should be recalled here once again that according to the basic inventive concept two one-way devices (according to the earlier definition of this term) are incorporated in the transmission train between the winding shaft —that is either the output shaft which also serves as an input shaft, or the separate input shaft provided for this purpose— and the spring which serves as the energy storing means. The one-way devices act in opposite directions in such a manner that the spring will be tensioned when the winding shaft is turned left as well as when it is turned right. To avoid any possible misunderstanding: the term one-way device defines a device according to the present invention which transmits torque only in one direction of rotation but which turns idly without transmitting torque when rotated in the other direction of rotation Discussing now firstly the embodiment in FIGS. 1a and 1b it will be seen that this one-way device cooperates with a winding shaft 1 —that is either a separate input shaft or output shaft which also serves as an input shaft— and on which a disc member 2 is mounted in non-rotatable sense, that is it is so mounted that it can rotate with but not relative to the shaft 1. At its opposite end faces the disc member 2 is provided with the engaging members 2a and 2b which are of identical outline and of which the outline of the member 2a is visible in FIG. 1b. The arrangement of the member 2b is such that it is mirror symmetrical with reference to the member 2a, and these members 2a and 2b each extend into recesses provided on wheels —preferably gear wheels— which are freely turnably mounted on the shaft 1 and are identified with reference numerals 3 and 4. If the wheels 3 and 4 are not gear wheels they may be connected in other suitable manner with the non-illustrated transmission. Details concerning the transmission will follow another embodiment.

FIG. 1b illustrates that the member 2a defines with the inner surface of the recess in the wheel 3 tapering recesses 5 which extend in circumferential direction and in which spherical members 6 are accommodated. If, now, the shaft 1 is turned in clockwise direction (as seen in FIG. 1b) the spherical members 6 will remain in the position in which they have been illustrated in FIG. 1b, that is at the larger ends of the respective recesses 5, so that the member 2a can turn in the recess of the wheel 3 without causing the latter to rotate. If on the other hand, the shaft 1 is turned in counterclockwise direction, then the spherical members will become displaced towards the narrower ends of the recesses 5 and as a result of the wedging action between the members 6, the member 2a and the wheel 3, the latter will become connected in motion-transmitting relationship with the member 2a and will rotate with the same and with the disc member 2. It will be readily understood that the mirror-symmetrical arrangement of the member 2b with respect to the member 2a, causes the wheel 4 to be connected in motion-transmitting relationship when the shaft rotates in clockwise direction, but not to be so connected when the shaft rotates in counterclockwise direction, that is the reverse of the arrangement with reference to the member 2a.

In the embodiment of FIGS. 2a and 2b the shaft is identified with reference numeral 7 and mounted thereon turnably and axially slidable against the influence of a pretensioned helical spring 10, are two wheels —again preferably gear wheels— 8 and 9. The axially outwardly directed end faces of these wheels are provided with annuli 8a and 9a, respectively, of sawtoothed-shaped teeth, with the teeth of the annulus 8a being inclined in one circumferential direction and the teeth of the annulus 9a being inclined in the opposite circumferential direction as will be readily appreciated from a glance at FIG. 2a. Axially outwardly of the wheels 8 and 9, and fast both against sliding and rotation with the shaft 7, are provided members 11 and 12 each of which is provided with annulus of sawtooth-shaped teeth 11a and 12a, respectively. These annuli 11a and 12a are adapted to mesh with the respectively associated annuli 8a and 9a, and in fact in FIG. 2a the annuli 8a and 11a are out of mesh whereas the annuli 9a and 12a are illustrated in mesh. When the shaft 7 is rotated in FIG. 2a in clockwise direction, the member 9 will be rotated on engagement of the annuli 9a and 12a, whereas the teeth of the annulus 11a will slide over the teeth of the annulus 8a without engaging therewith, and consequently without rotating the member 8, which, incidentally, will be displaced against the action of the spring 10 axially towards the member 9 for a distance corresponding to the depth of the teeth on the annuli 8a, 11a. If, on the other hand, the shaft 7 is rotated in counterclockwise direction, then it will be the teeth of the annuli 8a and 11a which engage so that the member 8 will be rotated, whereas the teeth of the annuli 9a and 12a will move out of engagement and the member 9 will not be rotated.

A third embodiment is illustrated in FIGS. 3a–3c. Here the shaft is identified with reference numeral 13 and mounted on it is a disc member 14 which is provided at its opposite axial faces with cross-shaped (compare FIG. 3b) engaging members 15 and 16. At the free ends of the arms of these members are provided axially projecting portions 15a and 16a which, as FIG. 3c shows clearly, are of sawtooth-shaped cross-section. Wheels 17 and 18 are freely turnable on the shaft 13 and are each provided on a side facing the member 14 with a plurality of depressions or recesses 17a and 18a, respectively, which are located on a circular track. The wheels 17 and 18 are preferably gear wheels.

FIG. 3 illustrates that the inclined flanks of the teeth 15a and 16a (compare the broken-line showing in FIG. 3a) are so inclined with reference to one another on the members 15 and 16, respectively, that when the shaft 13 is rotated in clockwise direction the wheel 17 will be turned, whereas when the shaft 13 is rotated in counterclockwise direction the wheel 18 will be turned. The arms 15b and 16b of the members 15 and 16, respectively, are springy so that the teeth of that one of the members 15 and 16 which during a given direction of rotation of the shaft 13 do not engage with the respectively associated wheel 17 and 18, are simply deflected out of the recesses 17a or 18a and slide over the surface of the wheel in which these recesses are provided.

A further embodiment of the novel one-way device is illustrated in FIGS. 4a and 4b. In this embodiment the shaft is identified with reference numeral 21 and carries a disc member 22 which is fast with it. At opposite axial sides of the disc member 22 are provided gear portions 22a and 22b which have sawtooth-shaped tooth formations (see FIG. 4b) with the teeth of the member 22a being inclined in one circumferential direction and those of the member 22b being inclined in the opposite circumferential direction.

Wheels 23 and 24 are located at opposite axial sides of the disc member 22 and are preferably constructed as gears. They are rotatable with respect to the shaft 21 and are prevented from axial displacement by suitable shoulders provided on the shaft 21, for instance circlips or spring clips 25, 26. The end faces of the wheels 23 and 24 which are directed towards the disc member 22, are provided with circular recesses or depressions 23a and 24a which respectively accommodate the gear portions 22a and 22b. There are further mounted within these recesses 23a and 24a springy or elastically deflectable pawls 23b and 24b, and FIG. 4b shows that the pawl 23b is fast with its end portion 23b' with the associated wheel 23b, whereas its free end engages elastically and springily with the teeth of the gear portion 22a. The same is true of the other pawl 23a and the associated gear teeth. It should be pointed out that the pawls can be of one piece with the respective wheels 23 and 24, if the latter are made of synthetic plastic material.

In the embodiment of FIGS. 4a and 4b rotation of the shaft 21 in clockwise direction will cause the wheel 23b to rotate with the shaft, whereas the wheel 24 will rotate with the shaft 21 when the latter rotates in counter-clockwise direction. In each case, of course, the other wheel will not rotate.

Further exemplary embodiments of novel one-way devices will later be described with respect to FIGS. 11a-d and 13. It is pointed out that in the herein following description of novel spring drives according to the present invention, one-way devices according to FIGS. 4, 11a-11d or 13 are illustrated as having been employed. It is clear, however, that it would similarly be possible to use in these spring drives the embodiments of FIGS. 1-3.

In all spring drive embodiments the energy storing means has been illustrated as a coil spring. The present invention can, however, be carried out with other energy storing means, such as with helical springs, with torsion springs which preferably should consist of rubber, or with other energy storing devices. It will also be understood that two gears may be replaced where appropriate with friction gears, with pulleys or the like.

Generally speaking, utilizing the concept according to the present invention, spring drives of the following basic constructions can be produced:

A. A spring drive wherein one end of the spring is connected with a supporting frame and the other with a gear wheel, hereinafter to be called a spring gear wheel. The spring is tensioned from a separate input shaft via a separate input transmission, and the output shaft is driven via an additional and separate output transmission. Such a construction is for instance disclosed in FIG. 6.

B. A further embodiment can utilize a spring in which one end is fast with a supporting frame and the other with a spring gear wheel. Here the spring is tensioned by the output shaft which also serves as the input shaft and which can be connected selectively in motion-transmitting relationship via a separate input transmission and with a separate output transmission. Such an embodiment is illustrated in FIG. 5.

C. According to a further concept the two ends of the spring are each connected with a spring gear wheel, and the spring is wound by means of a separate input shaft. The spring is wound from both of its ends and when it releases energy one of the spring gear wheels is arrested whereas the other spring gear wheel is connected in motion-transmitting relationship with the output shaft via a separate output transmission. This possibility is illustrated in FIG. 7.

D. Another embodiment provides for a construction in which both spring ends are connected with spring gear wheels, and in which the spring is tensioned from both of its ends by means of the output shaft which also serves as the input shaft. When the spring releases energy the drive operates in the manner of a differential drive, and such embodiments are illustrated in FIGS. 8-12.

It is to be pointed out, however, that modifications may be made and various combinations, so that the four basic categories are not by any means to be considered exhaustive of the possibilities.

Keeping this in mind, the embodiment of FIGS. 5a-5d will now be discussed. In this exemplary spring drive a spiral spring or coil spring 27 is provided, one end 27 of which is secured to a member 30 which extends between the side walls 28 and 29 of a supporting frame. The opposite end 27b is provided with a hook-shaped portion which engages behind a projection 31a of a spring shaft, a connection which is not only advantageous in terms of assembly but also permits free-wheeling of the drive when the spring 27 is relaxed, that is when it has dissipated its stored energy. It is to be pointed out, however, that free-wheeling can also be achieved if at least the shaft of one gear of the output transmission is so journalled in longitudinal slots that the motion-transmitting connection is interrupted after the spring has dissipated its energy so that the output wheels can turn without being connected with the spring. A toy vehicle provided with such a drive would then be coasting.

A spring gear wheel 32 is mounted on the spring shaft 31 fast therewith and meshes with the teeth 33a of a pinion 33 which is turnably journalled on a shaft 33c also extending between the side walls 28 and 29. There are further provided pairs of gears 34a, 34b, 35a, 35b and 36a, 36b which are mounted on shafts 34c, 35c and 36c, respectively. These shafts 34c, 35c and 36c are journalled in a pivotable frame composed of side walls 37 and 38 and which is mounted so that it can be pivoted against the action of a restoring spring 40 with reference to the frame having the side walls 28 and 29 about a pivot axis 39. The restoring spring 40 is pretensioned and is secured to the side walls 29, abutting with its free end on a projection 38a provided on the side wall 38 and which projection extends through a slot 29a provided for this purpose in the side wall 29.

Figure 5D:
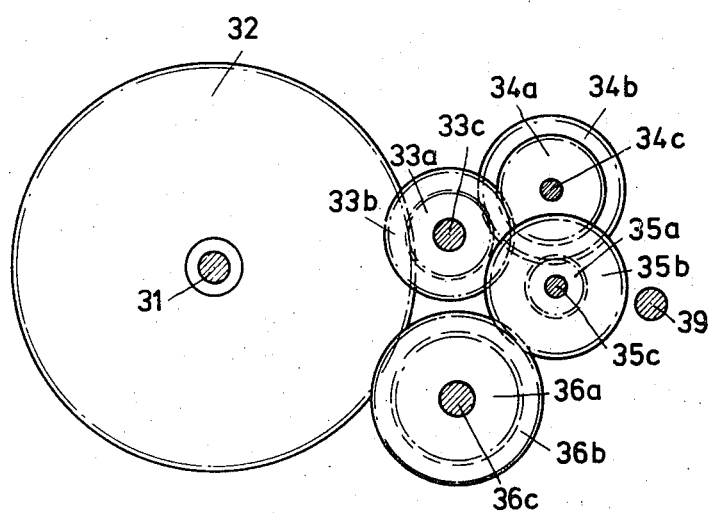
FIG. 5d is a view similar to FIG. 5c showing the gears during dissipation of energy.

In FIGS. 5c and 5d I have illustrated in particular the relative position of the gears during spring tensioning (energy storage) and spring discharge (energy dissipation) in simplified illustrations. In FIG. 5a and in FIG. 5b the drive is shown in the position which it will assume when energy is being discharged from the spring, and it will be seen that the spring gear wheel 32 is connected in motion transmitting relationship with the output shaft 36c via the pairs of gears 33a, 33b, 34a, 34b, 35a, 35b and the pinion 36b.

When it is desired to store energy, that is to tension the spring, the frame having the side walls 37 and 38 is pivoted about the pivot axis 39, so that the teeth 34a of the gears 34a, 34b move out of mesh with the gear 33b of the pair of gears 33a, 33b. This, as FIG. 5c clearly shows, interrupts the transmission between the spring gear wheel 32 and the output shaft 36c via the output transmission 33, 34 and 35.

As a result of this pivoting the pinion 36a simultaneously engages with the spring gear wheel 32 and the pinion 36b with the gear 33b of the pair of gears 33a, 33b, and now serves as a reversing pinion in accordance with the concept of the present invention. FIG. 5b shows that one-way devices 41a and 41b of the type discussed earlier are located between the pinions 36a, 36b and the output shaft 36c which now serves as the input shaft. The member 42 is now connected for rotation with the shaft 36c and is provided at its opposite axial sides with the arresting devices which cooperate with corresponding teeth on the pinions 36a and 36b. This one-way device is described in more detail in FIG. 13.

When, as shown in FIG. 5c, the shaft 36c is turned in counterclockwise direction, the spring gear wheel 32 is turned in clockwise direction and the spring 27 thereby tensioned. At the same time the pinion 36b is turned in direction oppositely the rotation of the pinion 36a, via the reversing pinion 33 which is also in mesh with the spring gear wheel 32, and this is possible due to the blocking or arresting teeth 41b. On the other hand, if the shaft 36c is turned in clockwise direction, then motion is transmitted via the pinion 36b and the gear 33b to the spring gear wheel 32 which then will again rotate in clockwise direction as before. The blocking teeth 41a operating between the pinion 36a and the member 42 permit the pinion 36a to turn in counterclockwise direction without transmitting motion.

Figure 6C:
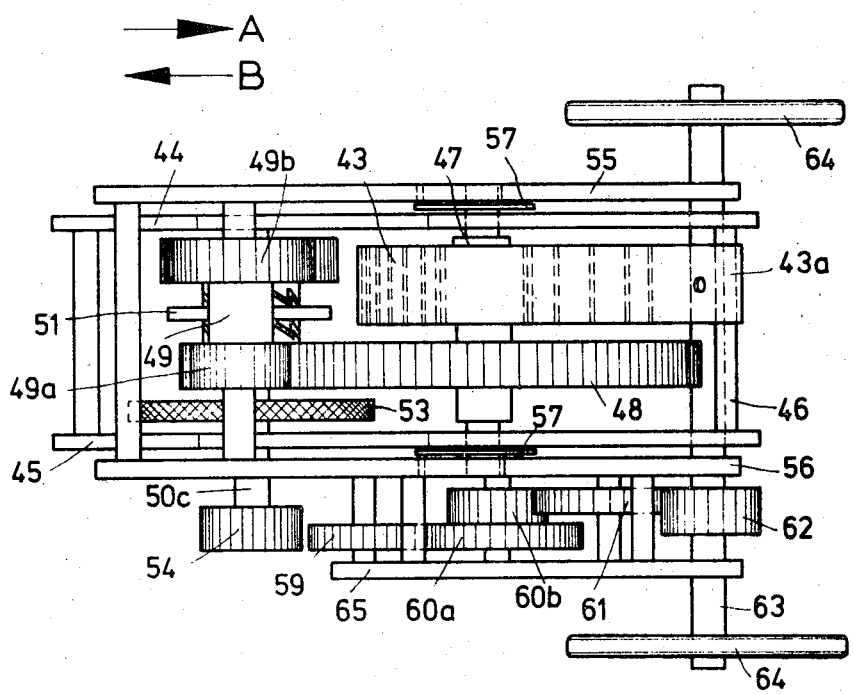
Figure 6D:
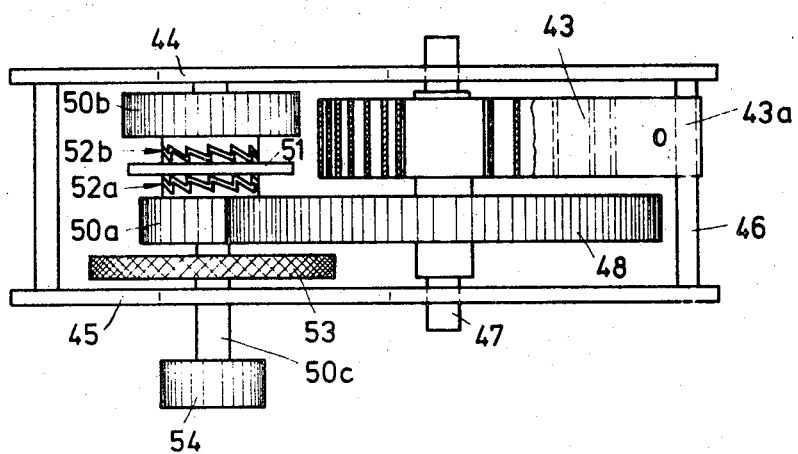
FIG. 6d is a top view of a detail of FIG. 6c.
Figure 6E:
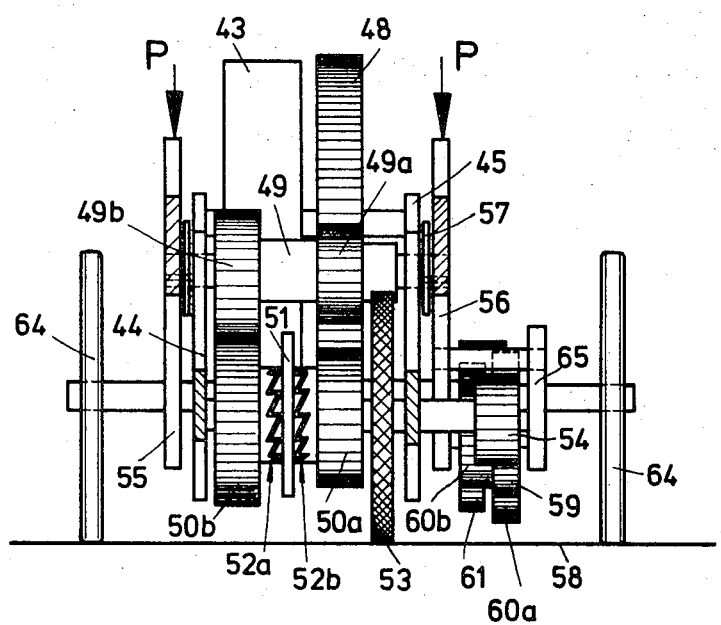

Coming now to the embodiment illustrated in FIGS. 6a–6e it will be seen that here also input transmission and output transmission are essentially separate. In addition there is provided a separate input shaft with a friction wheel for winding of the spring. The latter is again a spiral spring identified with reference numeral 43, and has one end 43 which is fast to a member 46 extending between and mounted to the sidewalls 44 and 45 of a supporting frame. The opposite end of the spring 43 is connected with the spring shaft 47 on which the spring gear wheel 48 is mounted so as to be non-rotatable with reference to the shaft. A direction-reversing pinion 49 is provided having a gear 49a which meshes with the spring gear wheel 48, and the latter is further in mesh with a first pinion 50a mounted on the input shaft 50c which also carries a second pinion 50b. The pinions 50a and 50b (compare especially FIGS. 6d and 6e) are connected with a disc member 51 which is fast with the input shaft 50c via oneway devices 52a and 52b acting in mutually opposite directions. The pinion 50b is located beneath the second gear 49b of the reversing pinion 49, as FIG. 6e shows clearly. The input shaft 50c additionally carries a friction wheel 53 which advantageously may consist of rubber or similar material, as well as the gear 54 which provides for motion-transmitting connection with the step-up transmission.

The spring shaft 47 as well as the input shaft 50c are journalled between the side walls 44 and 45 of the frame which is preferably mounted in the body of a toy vehicle, such as a toy automobile. Secured to this frame is a further frame utilizing the side walls 55 and 56 and being turnable about the spring shaft 47. Spiral springs located between the side walls 54 and 55, and 45 and 56 and identified with reference numeral 57, assure that the frames will normally be in the relative position shown in FIG. 6b in which the friction wheel 53 is out of contact with a surface 58 on which the vehicle rests. Also in this position, the gear 54 on the shaft 50 is in transmitting connection with the shaft 63 via the gears 59, 60a, 60b, 61 and 62, and the shaft 63 drives the vehicle wheels 64. The shafts 59c, 60c and 61c of the output transmission are journalled between the side wheels 56 and 65 which are connected by elements 66. In FIG. 6d frame 44, 45 with spring 43, spring gear wheel 48, pinion 50a and 50b and friction wheel 53 are separately illustrated for purposes of greater clarity and illustration.

If, now, the vehicle rests on the surface 58 and a pressure is exerted in the direction of the arrow P in FIGS. 6a and 6e on the frame 55, 56, then the friction wheel 53 is displaced into engagement with the surface 58, with simultaneous pivoting of the frame 55, 56 in counterclockwise direction. This pivoting results in disengagement of the gear 54 and the first gear 59 of the output transmission, whereas the gear 49b of the reversing pinion 49 moves into mesh with the pinion 50b. If, in this position, the toy vehicle is now moved along the surface 58 in the direction of the arrow A shown in FIGS. 6a and 6c, the friction wheel 53 and with the same the pinion 50a will turn in clockwise direction. This results in rotation of the spring gear wheel 48 in counterclockwise direction and tensioning of the spring 43. Due to the mesh of the reversing pinion 49 with the spring gear wheel 48 as well as the second pinion 50b, the latter rotates in counterclockwise direction with respect to the rotation of the pinion 50a due to the arrangement of the teeth of the one-way device 52b.

On the other hand, if the vehicle is moved in the direction of the arrow B, the friction wheel 53 will turn in counterclockwise direction and the reversing pinion is rotated in clockwise direction via the one-way device 52b, which again results in rotation of the spring gear wheel 48 in counterclockwise direction so that the spring 43 is again tensioned. In this case it is the one-way device 52a which permits the rotation of the pinion 50a which remains in mesh with the spring gear wheel 48, in clockwise direction opposite the direction of rotation of the pinion 50b. When pressure on the vehicle and thereby on the frame 55, 56 is released, the friction wheel 53 is automatically lifted off the surface 58 and the motion-transmitting connection between the spring gear wheel 48 and the output transmission 59–62 is again restored via the gear 54.

The embodiment illustrated in FIGS. 7a–7d operates during energy discharge in the same manner as the embodiment discussed with respect to FIG. 5. During energy storage, however, the spring is tensioned not only from one end but from both ends. In this embodiment a spring casing 67 is provided accommodating the spring whose one end is connected with a spring gear wheel 68 and whose other end is connected with a second spring gear wheel 69 both of which are freely turnably journalled on a shaft 72 which in turn is journalled between and in the side walls 70 and 71. The spring gear wheel 68 meshes with the gear 73a of a reversing pinion 73 the shaft 73c of which is also journalled between the side walls 70 and 71. The reversing pinion 73 has a further gear 73b which in the energy discharge position is connected with the output shaft 76c via the pairs of gears 74a, 74b, 75a, 75b and 76d. Shaft 74c, 75c and 76c of these gears are journalled in a pivotable frame composed of the side walls 77 and 78 and which is pivotable with respect to the frame having the side walls 70 and 71 about a pivot axis 79, such pivoting being countered by a restoring spring 80. The pivoting against the action of the restoring spring takes place in counterclockwise direction, and the restoring spring 80 is connected fast with the side wall 70 at one end whereas its other end abuts against the projection 70a provided on an extension of the side wall 78 and which projection 70a extends through a slotted aperture 71a in the side wall 71.

FIGS. 7a and 7b show the position of the wheels on energy discharged from the spring. To the rest one spring end during such discharge, the spring gear wheel 69 is made fast with an arresting wheel 81 which cooperates with an arresting pawl 83 pivotably mounted on one of the connecting members 82 for the side walls. An engaging tooth 83 is provided at the leading end of the pawl 83 and is urged by the spring 84 into the teeth of the wheel 81. When the spring discharges energy, the spring gear wheel 69 tends to turn in clockwise direction whereas the spring gear wheel 68 simultaneously turns in counterclockwise direction. As FIG. 7 shows, the spring gear wheel 69 and thereby one end of the spring is held against rotation by means of the pawl 83 and the wheel 81 as the energy is discharged from the spring via the rotating spring gear wheel 68.

To store energy in the spring the pivotable frame with the walls 77 and 78 is pivoted in clockwise direction about the axis 79. If, for instance, the drive in this embodiment is mounted in a toy vehicle in which the frame 70, 71 is connected with the body of the vehicle and the wheels are mounted on the shaft 76c, then it is only necessary to exert on the body of the vehicle and thereby upon the frames 70, 71 a slight pressure in the direction of the arrow P. This causes the pinion 76a to engage with the spring gear wheel 68 and the pinion 76b to similarly engage with the spring gear wheel 69 and with the gear 73b of the direction-reversing pinion 73. At the same time the gear 74a is moved out of mesh with the gear 73b of the reversing pinion 73 whereby the motion-transmitting connection connection between the spring gear wheel 68 and the output shaft 76c —which latter now serves as the input shaft— is interrupted.

Figure 7C:
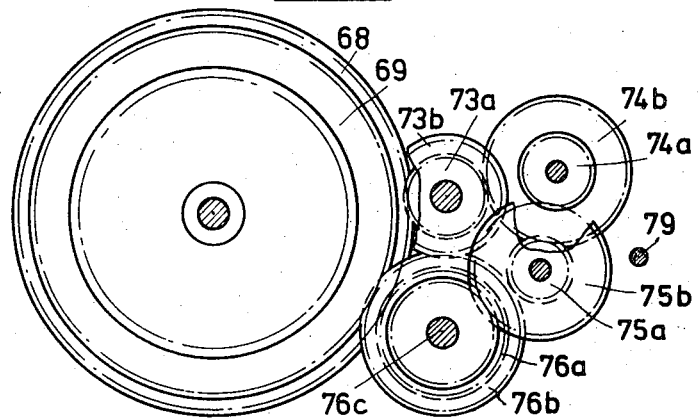
FIG. 7c is a partially broken side view illustrating the gears of the spring drive of FIG. 7a during energy storing.

In FIG. 7c I have illustrated in a simplified diagrammatic manner the position of the various gears when energy is to be stored. When the shaft 76c is turned either in clockwise direction or in counterclockwise direction, both of the spring gear wheels 78 and 79 are always turned in mutually opposite directions in counterclockwise or clockwise direction. This means that independently of the direction of rotation of the shaft 76c, the spring will always be tensioned from both of its ends. Clearly, if the shaft 76c is turned in clockwise direction, it transmits motion to the pinion 76b via the disc member 85 and the one-way device 86b so that the pinion 76b drives the spring gear wheel 69 in counterclockwise direction in rotation. As this takes place, the tooth 83a of the pawl 83 slides over the inclined flanks of the arresting wheel 81 which is fast with the spring gear wheel 69. At the same time the pinion 76b is in mesh with the gear 73b of the reversing pinion 73c, as shown in FIG. 7, so that the spring gear wheel 68 is driven in clockwise direction by the gear 73a of the reversing pinion 73 which is fast with the gear 73b. Because the pinion 76a meshes with the spring gear wheel 68, it will also be turned in direction opposite the rotation of the shaft 76c, a motion which is permitted by the one-way device 86a.

Conversely, when the shaft 76c is turned in counterclockwise direction, the reverse motions take place such that the spring gear wheels 68 and 69 will again be driven in mutually opposite directions in counterclockwise and clockwise direction, respectively. Shaft 76c turns pinion 76a via the member 85 and the one-way device 86a in counterclockwise direction, whereby the spring gear wheel 68 will turn in clockwise direction. The pinion 76b is driven in clockwise direction against the direction of rotation of the shaft 76c via the reversing pinion 73, whose gear 73a meshes with the spring gear wheel 68. This causes the one-way device 86b to become disengaged in the manner described above. The spring gear wheel 69 is again driven by the pinion 76b in counterclockwise direction, so that again the spring will be tensioned from both ends.

Figure 7D:
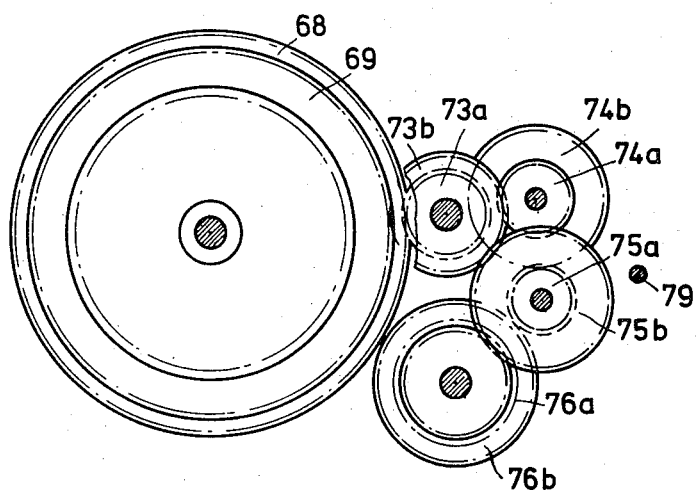
FIG. 7d is a view similar to FIG. 7c but illustrating the gears during energy dissipation.

When the force P is released, then the pivotable frame with the walls 77 and 78 is restored by the spring 80 to the position illustrated in FIGS. 7a and 7d, causing the output transmission to mesh with the pinion 73 and the pinions 76a and 76b to move out of mesh with the spring gear wheels 68 and 69 as well as with the gear 73b of the reversing pinion 73.

FIGS. 8a–8d show a simplified embodiment of the invention, analogous to that in FIG. 7. In the embodiment of FIGS. 8a–8d the input and output transmissions as well as the input and output shaft are identical. The spring in this embodiment is again mounted in a spring casing 87, being connected at its opposite ends with two spring gear wheels 88 and 89, respectively, which are freely turnable on a shaft 92 mounted and journalled between the side walls 90 and 91.

Figure 8A:
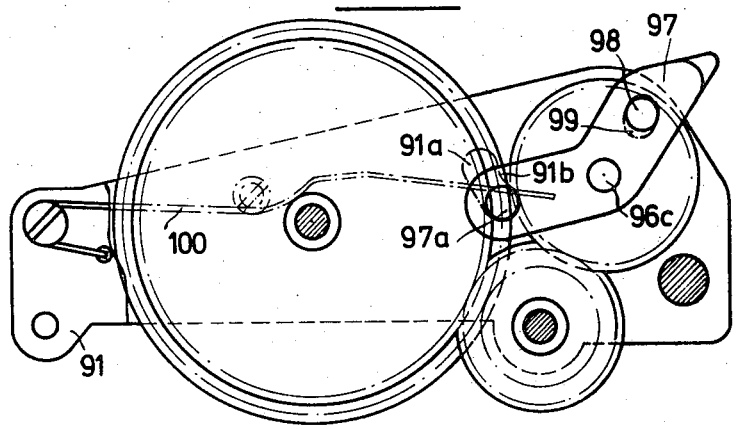
FIG. 8a is a partially broken-away side view of a fourth embodiment of the novel spring drive, as seen on line VIIIa—VIIIa of FIG. 8c.
Figure 8B:
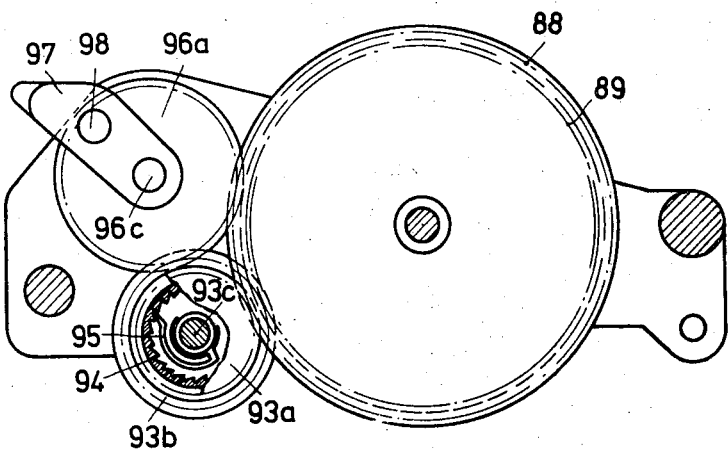
FIG. 8b is a side view seen on line VIIIb—VIIIb of FIG. 8c and illustrating the energy-storing condition.

Pinions 93a and 93b respectively are associated with the spring gear wheels 88 and 89 and are mounted on a shaft 93c with which they can be connected in mutually opposite directions of rotation by means of the illustrated one-way devices shown in FIG. 8b. These devices are here in form of inner teeth 94 with sawtooth-shaped configuration located within the pinions 93a and 93b and cooperating with a pawl 95 which is nonrotatably secured on the shaft 93c.

To wind or store energy in this drive one proceeds in the same manner as discussed above with reference to the embodiment of FIG. 7. In the energy storing position shown in FIG. 8b the gear 96a of the reversing pinion 96 is in mesh with the spring gear wheel 88, whereas the second equally-dimensioned gear 96b is always in mesh with the spring gear wheel 93b.

A bifurcated pivotal frame 97 is provided which is journalled between the walls 90 and 91 by means of pins 98 and which provides for a control of the pinion 96. At least one journal 99 for the pins 98 is slotted, that is in form of a longitudinally extending opening.

The extended arm of the bifurcated frame 97 is provided with a pin 97a which extends through a further slotted opening 91a provided in the side wall 91 and which, in conjunction with the opening 99, serves for the forcible guidance of the bifurcated frame 97 and therefore of the reversing pinion 96. It should be noted that the slotted openings 91a and 99 are so arranged that when the pivotable bifurcated frame 97 is depressed, the gear 96a will always reliably mesh with the spring gear wheel 88, whereas when the bifurcated frame 97 is not depressed the gear will reliably be out of mesh with the spring gear wheel 88. Such a control arrangement is necessary at least if the gears are located close together and are so dimensioned that only short distances need be travelled between engagement and disengagement. An abutment 91b is provided within the opening 91a, and the projection 97a can additionally abut against this when the frame 97 is depressed. The return of the frame 97 to its normal undepressed position is effected by a restoring spring 100, one end of which is connected with the side wall 91 and the other end of which is in abutment with the projection 97a.

The proper operation of this particular embodiment depends heavily upon the journalling of the bifurcated frame 97. Particularly if the drive according to this embodiment is provided in a toy for a child, the force which must be exerted upon the frame 97 should be as small as possible. In addition, the frame 97 must be so journalled that there will be no disengagement of the pinion 96 despite the spring tension to which it will be subjected during winding of the spring. I have found that I can obtain a highly satisfactory solution to these problems if the axis of the pins 98 is located on a rearward extension of the line 101 which bisects an angle α included between lines which connect the center points of the shafts 92 and 96c on the one hand, and the shafts 93c and 96c on the other hand. In such an arrangement the torque forces which originate in the spring gear wheels 88 and 89 during tensioning of the spring, and which are in the region of the engagements 102 and 103, will substantially negate one another, as is clearly evident from FIG. 8d.

Figure 8C:
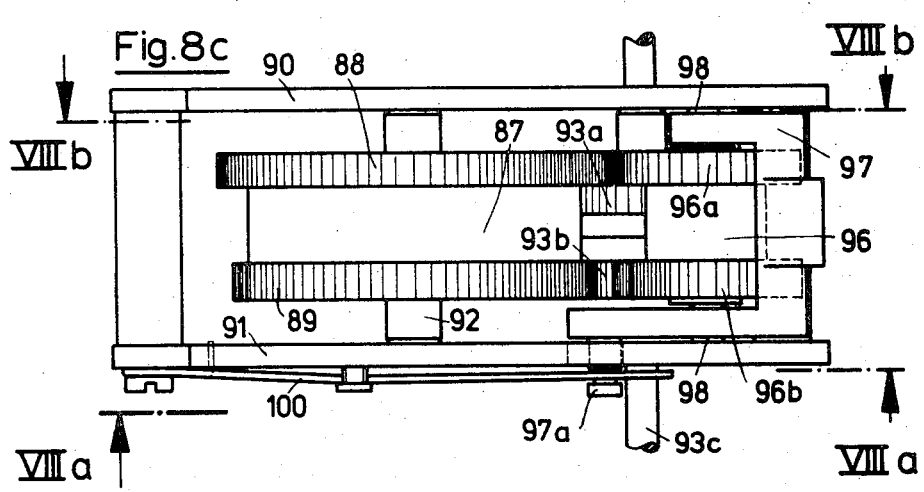
Figure 8D:
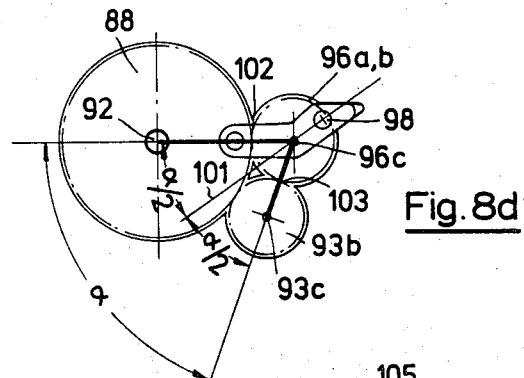
FIG. 8d illustrates the arrangement of the gears on a reduced scale and during energy storage.

When the spring is to discharge energy, the force exerted to pivot the frame 97 in clockwise direction is released, so that it is restored by the spring 100 to the position shown in FIGS. 8a and 8c. When this takes place, the gears 88 and 96a become disengaged and the reversing pinion 96 —which continues to mesh with its gear 96b with the pinion 93b— will turn idly when the spring discharges energy.

During such discharge this embodiment works substantially in the manner of a differential drive, in which both of the spring gear wheels 88 and 89 exert mutually opposite torque forces upon the pinions 93a and 93b which are non-rotatably connected with one another during spring discharge. Because of the differential transmission ratios between the associated gears the shaft 93c only yields the differential moment and the spring gear wheels 88 and 89 will gradually turn with reference to one another until finally the spring in the casing 87 has discharged.

Figure 9A:
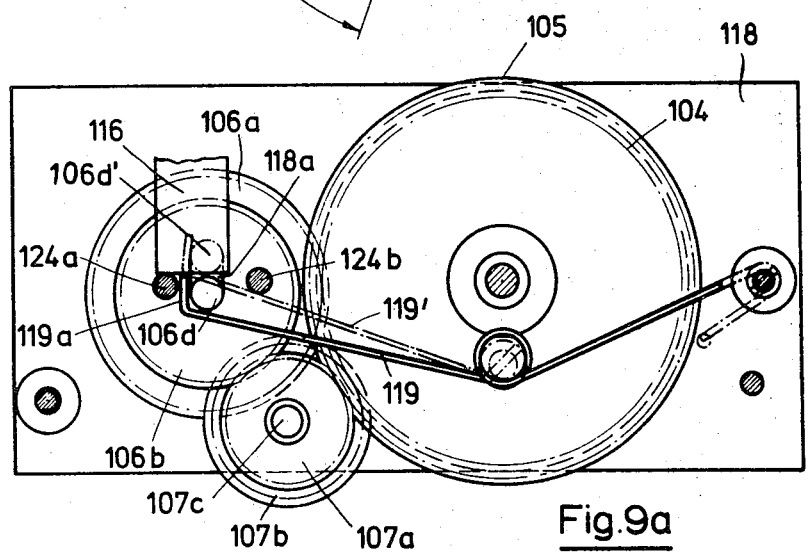
FIG. 9a is a side view of a fifth embodiment of the invention during energy storage.
Figure 9B:
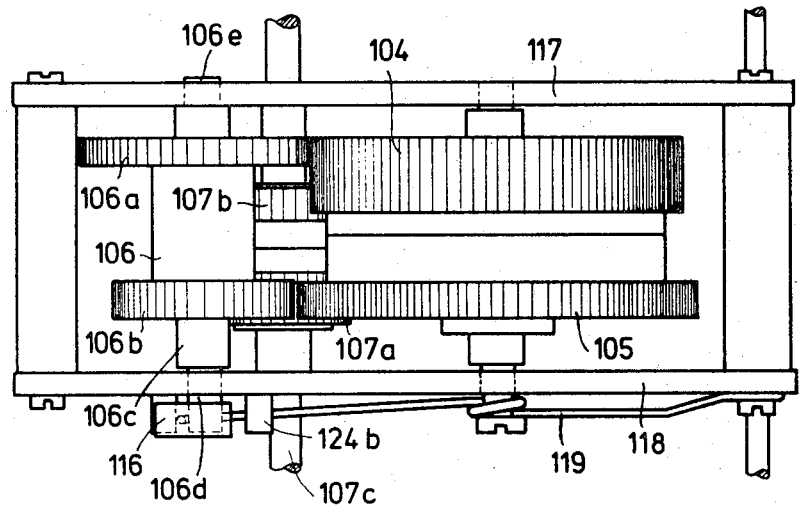
Figure 9C:
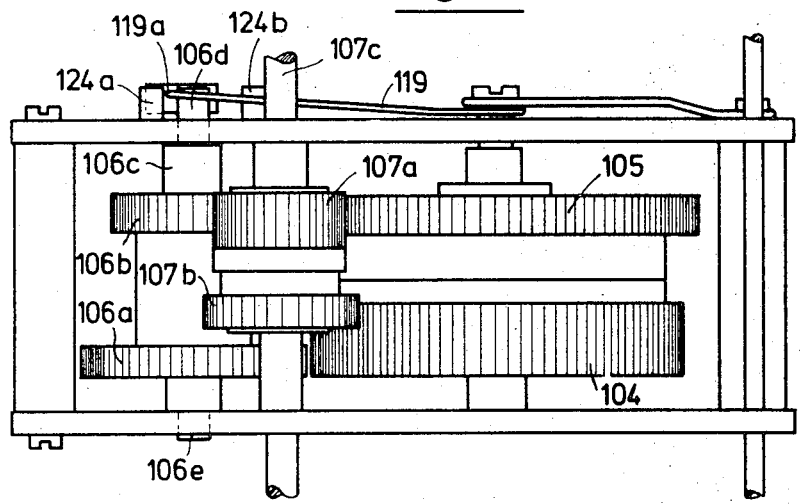
FIG. 9c is a bottom view of FIG. 9a showing energy dissipating condition.

In the preceding embodiments the larger of the two spring gear wheels is invariably in mesh via the reversing pinion with the larger of the two pinions mounted on the output shaft, for energy storing or spring tensioning purposes. This arrangement permits a compact construction. However, as illustrated in the embodiment of FIGS. 9a-9c, it is by all means possible to have the smaller of the two spring gear wheels, here identified with reference numeral 104, in motion transmitting relationship with the smaller of the two pinions mounted on the output shaft 107c, here the pinion 107a, via the reversing pinion 106. In this case the gear 106a must be so dimensioned in its diameter, and so laterally offset with reference to the pinion 107b, that it extends laterally past the same and can be placed into mesh with the spring gear wheel 104. In the illustrated embodiment the axial length or width of the gear 104 is so substantial that it can mesh both with the gear 106a of the reversing pinion 106 as well as with the pinion 107b mounted on the output shaft 107c. This arrangement is particularly advantageous if even tensioning is to be obtained in both directions of rotation of the shaft 107c. The transmission ratio between the gears 106a and 106b of the reversing pinion 106 causes a compensation of the difference between the transmission raio of the pinion gears 107a, 107b on the one hand and the spring gear wheels 105 and 104 on the other hand. This effect, incidentally, can also be achieved in the embodiments which have been described before, keeping in mind that the larger gear of the reversing pinion must be located at the same side as the larger of the pinions which mesh with the spring gear wheels of the respective embodiment.

A further difference in the embodiment of FIG. 9 over the preceding embodiments is the fact that the reversing pinion 106 is not mounted in a separate pivotable frame. Instead, it is directly journalled between the side walls 117, 118, resulting in a further simplification of the construction. Such a drive is especially suitable for miniature racing cars and similar applications. The shaft 106c is journalled with its opposite end portions 106d and 106e in openings of the side walls 117, 118, respectively, and the opening for the end portion 106d is configurated as an elongsted slot 118a, whereas the other opening for the end portion 106e (located in the side wall 117) corresponds to the cross-sectional configuration of this end portion 106e.

Due to the provision of the slot-shaped opening 118a the gear 106b of the reversing pinion 106 can be moved out of mesh with the pinion 107a, for which purpose the restoring spring 119 is provided which is secured on the side wall 118 and whose leading end or front end engages the end portion 106d. In non-stressed condition the spring 119 has the configuration shown in broken lines and identified with reference numeral 119' and lifts the shaft end portion 106d into the upper position shown in broken lines and identified with reference numeral 106d.

The reversal or control of the pinion 106 takes place as follows, assuming that the drive is pivotably mounted for instance in the body of a toy vehicle. An abutment 116 is provided on the body in the region of the shaft end portion 106d and when —for purposes of winding the spring of the drive— the vehicle body is depressed as discussed in the preceding embodiments, the abutment 116 depresses the shaft end portion 106d downwardly against the urging of the restoring spring 119, thereby crossing the gear 106b to move into mesh with the pinion 107a. In the lowermost position the abutment 116 engages on a projection 124a provided on the side wall 118 so that the shaft end portion 106b can freely turn in this position at relatively low friction.

For the same reason the deformed end 119a of the restoring spring 119 is made long enough so that in this position the spring will also no longer exert any pressure on the shaft 106.

When the pressure on the vehicle body is released, the movements of the components will be reversed and the restoring spring will move to the position 119' in which it abuts against a second abutment 124b provided on the side wall 118. This abutment 124b is also arranged in such a manner that in the upper position the restoring spring cannot exert any pressure on the shaft end portion in the position 106d' thereof, so that the rotation of the reversing pinion is not braked by the restoring spring 119.

It is pointed out here that the control of the pinion 106 could also be effected in such a manner that the gear 106d remains in mesh with the pinion 107a, and that the meshing engagement of the gear 106a and the spring gear wheel 104 is controlled, that is established and disrupted as required.

In the embodiments disclosed heretofore the one-way devices are always mounted either on the input shaft or on the output shaft. It is however not necessary that the arrangement be limited to this concept, and FIG. 10 illustrates how the arrangement can be modified so that the one-way devices are arranged in a different manner.

In particular, in the embodiment of FIG. 10 —which otherwise resembles the embodiment of FIG. 8— the disc member 108d mounted on the shaft 108c can be configured as a gear which drives the actual output shaft 109 via a gear 110 connected with the output shaft 109. This arrangement can be particularly advantageous if stronger springs are used which make greater step-up necessary. Although it is true that in theory the differential drive can achieve any desired step-up ratio, there is the possibility that where very substantial step-up ratios exist the two spring gear wheels may block one another in certain relative positions via the pinion which is common them. At least, the differential drive will operate and rotate unevenly if only small tooth differences exist between the two spring gear wheels. The arrangement of FIG. 10 is also necessary when the gear 110 is to be replaced by a known differential drive between the output shaft 108c and the shaft 109 of the wheels 111 which are to be driven.

Coming now to the embodiment illustrated in FIGS. 11a–11e it will be seen that this also is constructed as a differential drive. However, contrary to the embodiments of FIGS. 8 and 10 the differential drive of FIGS. 11a–11e does not utilize a reversing pinion and must, for this reason, have a blocking arrangement which —when the spring is being wound— will alternately block one spring end so that the spring can always be wound from one or the other spring end.

As the drawing shows, the embodiment of FIGS. 11a–11e is provided with a spring shaft 132 and a pinion shaft 133 on which all other gears are mounted and which shafts are journalled between the side walls 130 and 131. The spring gear wheel 135 is journalled together with a spring casing on the spring shaft 132, on which latter there is also mounted the spring gear wheel 134 which is fast with the shaft 132. The pinion shaft 131 has mounted thereon the pinion gears 136 and 137 which are separated by the disc member 131a.

Figure 11A:
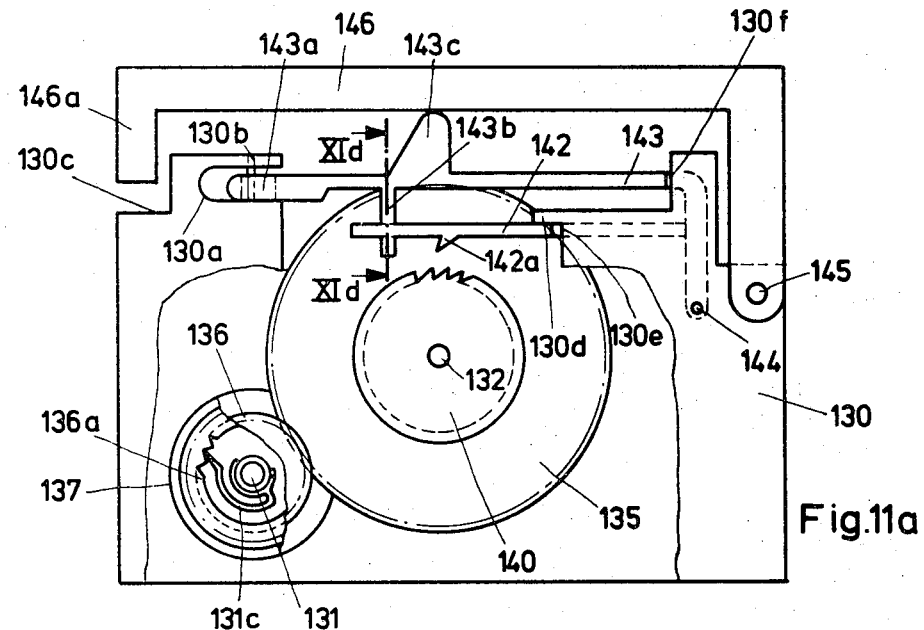
Figure 11B:
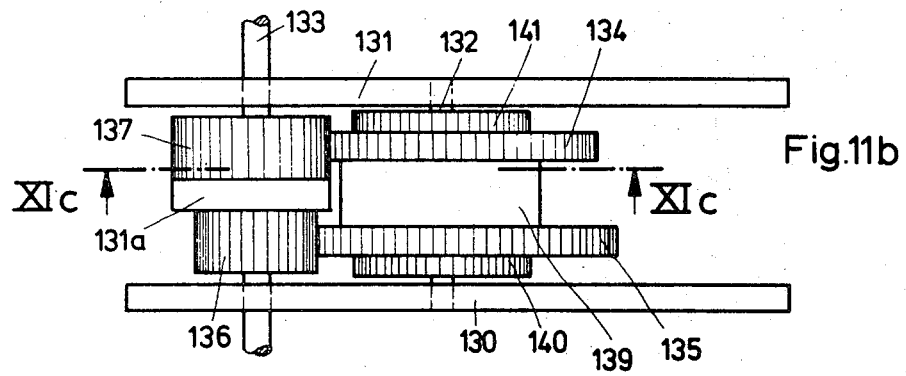
Figure 11C:
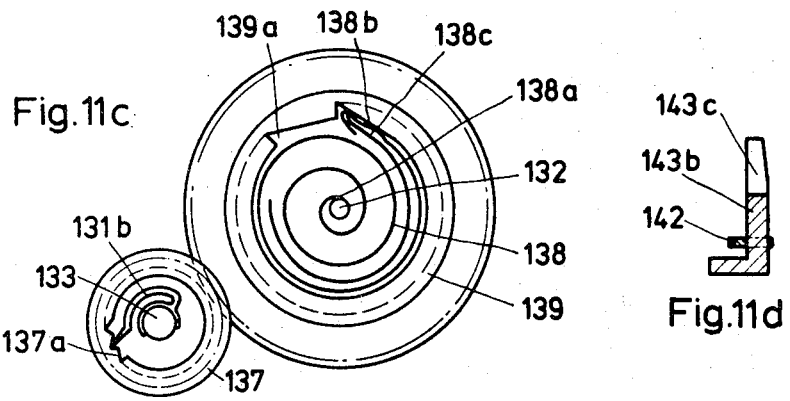
FIG. 11c is a section taken on line XIc—XIc of FIG. 11b.

The spring in this embodiment is identified with reference numeral 138 and shown in FIG. 11c as being mounted in the spring casing 139. The inner end 138a of the spring 138 is connected with the spring shaft 132. The spring gear wheels 135 and 134 of spring casing 139 and of spring shaft 132 are each connected with blocking gears 140 and 141 of oppositely directed teeth with which they are made fast. The blocking gear 140 is associated with the blocking pawl 142 which is illustrated in FIG. 11a, whereas a similar blocking pawl (not illustrated) cooperates with the blocking wheel 141 and corresponds in its construction to the blocking pawl 142 but is offset through 180° with reference to the same.

The spring gear wheel 135 cams with the gear 136, whereas the spring gear wheel 134 cams with the gear 137. Located inside the gears 136 and 137 are the one-way devices which will be subsequently described below.

The operation of the embodiment of FIGS. 11a–11e causes, when the shaft 131 is turned in clockwise direction in FIGS. 11a and 11c, the gears 136 and 135 to be turned and the outer spring end 138b to be taken along via the casing 139. The non-illustrated pawl cooperating with the blocking wheel 141 retains the same, the spring gear wheel 134 and the spring shaft 132 against rotation, whereby the inner spring end 138a is prevented from displacement so that the spring 138 is tensioned from its outer end. As this takes place, the projection 142a of the pawl 142 slides loosely over the teeth of the blocking gear 140 without camming therewith.

If, on the other hand, the shaft 133 is turned in counterclockwise direction, the gears 137 and 134 are turned, and via the spring shaft 132 the inner end 138a of the spring 138 is taken along. During such movement the pawl 142 engages the blocking wheel 140 and, via the same, maintains the gear 135 and the spring casing 139 against movement, whereby the outer spring end 138b is similarly maintained against movement. This causes the spring 138 to be wound from its inner end whereas the projection of the non-illustrated pawl slides loosely over the teeth of the blocking wheel 141 without camming with the same.

In the embodiment of FIGS. 11a–11e the two one-way devices are in form of pawls mounted on the shaft 133, with only one pawl 131b or 131c being illustrated, and inner teeth 136a and 137a of sawtooth-shaped configuration. These one-way devices prevent the shaft 133 from being turned with reference to the gear 136 in any sense other than in counterclockwise direction, and from being turned with reference to the gear 137 in any sense other than in clockwise direction. When in the illustrated embodiment the spring 138 is to be wound, the pawls 142 are first to be brought into mesh with the teeth of the blocking gears 140 and 141. By turning the shaft 133 in opposite directions the spring 138 is alternately wound from its outer and from its inner end.

Figure 11D:
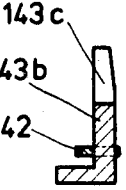

The pawls 142 which cooperate with the blocking gears 140 and 141 are provided in the upper portions of the side walls 130 and 131. The pawl 142 is elastically deflectable and provided with the projection 142a; it is connected with a similarly elastically deflectable but stronger control member 143 which is turnably journalled at the wall 130 at 144. Member 143 has a free end portion 143a which is longitudinally slidably mounted in a slot 130a of the wall 130 and guided by a pin 130b which extends through an opening in the end portion 143a. The member 143 is further provided with a releasing arm 143b which, as FIG. 11d shows, extends beneath the pawl with its end portion which is bent at a right angle to the remainder of the arm 143b. A control projection 143c is provided above the arm 143b and the actuating lever 146 —which is turnable about the axle 145— abuts on this projection 143c. The lever 146 also actuates the non-illustrated other pawl which is mounted on the side wall 131. The lever 146 has a free angled end portion 146a which, when depressed, will abut with its end face on the projection 130c of the wall 130 and thereby limit the path of displacement of the lever 146. The surfaces 130d and 130e of the member 130 serve to delimit the vertical and horizontal movements, respectively, of the pawl 142 and the surface 130f is the rearward abutment for the arm 143.

When the arm 143 is moved downwardly by means of the lever 146, the projection 142a moves into mesh with the teeth of the blocking wheel 140. Because the pawl is elastically deflectable the blocking wheel 140 which is fast with the gear 135 can freely be turned in counterclockwise direction, with the projection 142a sliding over the teeth of the blocking wheel 140 and the free end of the pawl being lifted off the right-angle end portion of the arm 143b. When the lever 143 is released, the arm 143b lifts the pawl 142 off and out of engagement with the teeth of the blocking wheel 140.

With the construction according to FIGS. 11a–11e the spring characteristics of the pawl 142 and of the arm 143 can be readily adapted to any prevailing requirements. Thus, the pretension of the depressed pawl 142 must not be so large that the friction between the projection 142a and the teeth of the blocking wheel 140 —which turns in counterclockwise direction— is excessively high. On the other hand a relatively great restoring force is necessary to release the projection 142 from the teeth of the blocking wheel 140 when the spring is wound, and it is for this reason that the arm 143 is provided which is stronger than the pawl 142.

When a torque acts upon the blocking wheel 140 and thereby upon the spring gear wheel 135 in clockwise direction, the depressed pawl 142 blocks rotation in this direction, abutting against the surfaces 130d and 130e of the side wall 130. Correspondingly, of course, the arm 143 abuts against the surface 130f. The arm 146, turnable about the axis 145, is provided for simultaneously activating the two pawl arrangements for both blocking wheels 140 and 141.

If the embodiment of FIG. 11 is used in a toy automobile or similar vehicle, it is also possible to so mount it within the body 147 (see FIG. 11e) of the vehicle that it is pivotable about an axis 145 which extends in parallelism with the vehicle axis 148 and 149. In this case the projections 143c of the arm 143 abut directly against a body portion 150 and the pawls are activated by depressing the entire vehicle body in the direction of the arrow P. In such an arrangement the vehicle axis 148 can be identical with the pinion shaft 133 which is shown in FIGS. 11a–11c.

In the embodiment of FIGS. 12a–12d I have illustrated a further embodiment which is a modification of the one in FIGS. 11a–11e. In its operation the embodiment of FIGS. 12a–12b correspond to that shown in FIG. 8.

In this embodiment there are two side walls 151 and 152 provided, between which are journalled the spring shaft 153 and the pinion shaft 154 on which all other gears are mounted. On the spring shaft 153 there is mounted the spring gear wheel 155 which is fast with the shaft, and also the spring gear wheel 156 which is connected with the spring casing 157. Mounted on the pinion shaft 154 are the two pinion gears 158 and 159 between which there is mounted a disc member 160 which is non-rotatably fast with the shaft 154. A spiral spring is provided which is located (see FIG. 11c) within the spring casing 157.

Located within the gears 158 and 59 are one-way devices corresponding to those discussed above with respect to the embodiment of FIG. 11. They utilize springy pawls 154a and 154b which are fast with the shaft 154 and which are directed towards one another, that is in opposite direction. The pawls 154a and 154b cooperate with the inner teeth 158a and 159a of the gears 158 and 159 in the same manner as discussed above with respect to FIG. 11.

A second pinion, a reversing pin 161, is located above the pinion gears 158 and 159 and cams on the one hand with the larger spring gear wheel 155 and on the other hand with the larger pinion gear 159. This is shown particularly in FIGS. 12a and 12c. The shaft 162 of the reversing pinion 161 is mounted between the two arms 163a and 163b of a bifurcated member 163 which is turnably mounted on the spring shaft 153 and which abuts with one arm 153c on a projection 164 located between the two plates 151 and 152 and serving as an abutment. The arms 163a and 163b are connected with one another via an actuating member 163c, and an arm 165 abuts on the member 163d, being connected pivotably with the arrangement at 166.

Figure 12A:
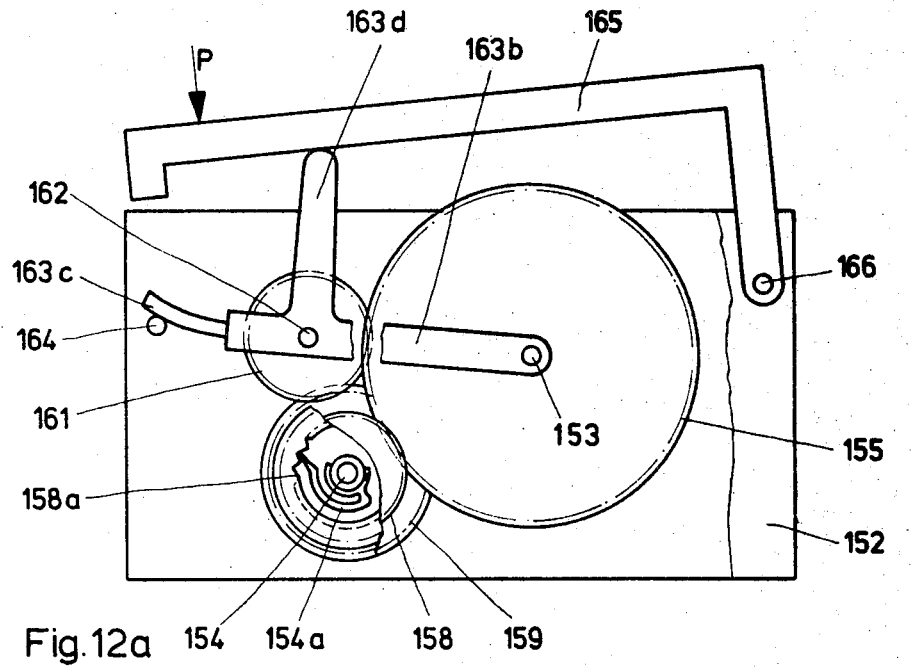
Figure 12B:
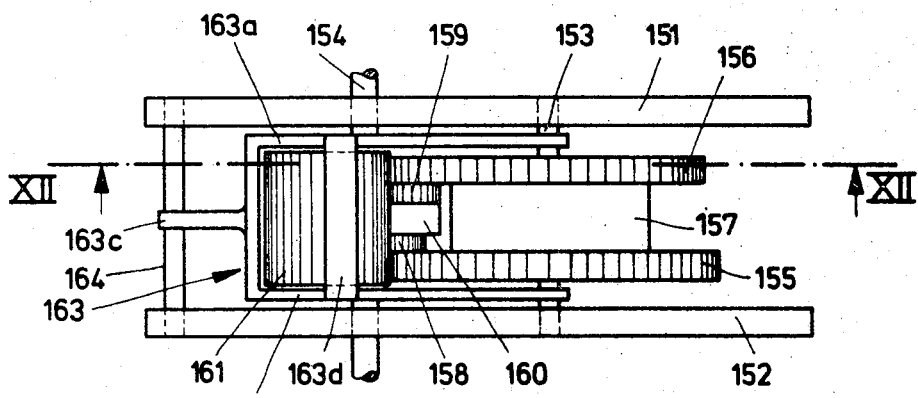
FIG. 12b is a plan view of FIG. 12a with certain components omitted for clarity.
Figure 12:
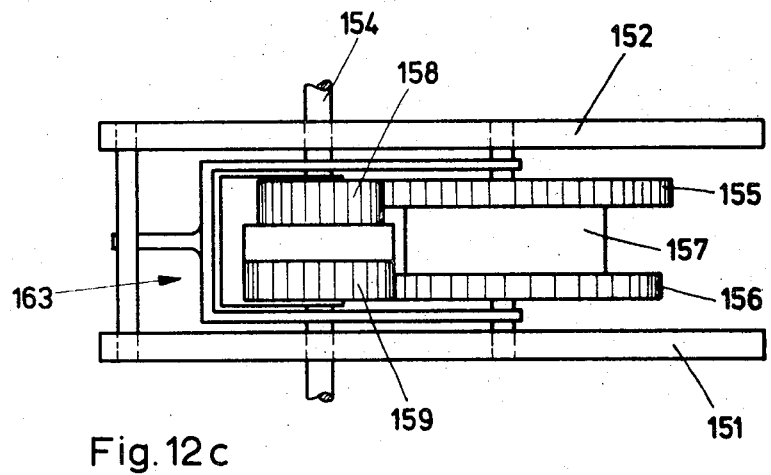
FIG. 12 is a partially broken away side view of an eighth embodiment of the invention, illustrating energy storing conditions.
Figure 12:
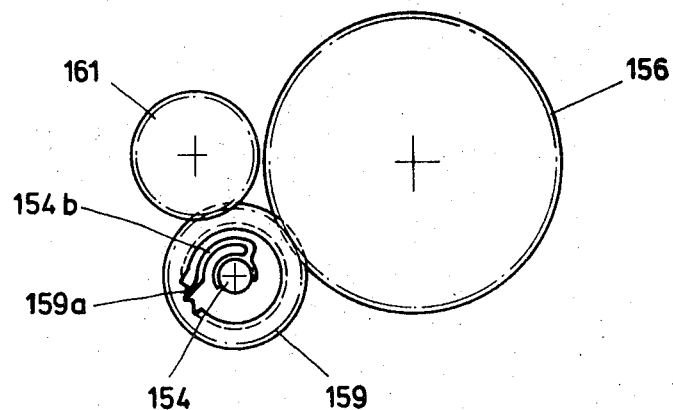

In FIG. 12a I have shown the drive of this embodiment in a position in which turning of the shaft 154 in clockwise direction will cause the spring gear wheel 155 to be displaced in counterclockwise direction via the pinion gear 158. At the same time the spring gear wheel 156 will be turned in clockwise direction via the reversing pinion 161 which meshes with the gear 155 and the pinion gear 159. During turning of the shaft 154 in this sense the pawl 154b can slide over the inner teeth 159a without camming therewith, the pinion gear 159 can turn in direction opposite to the rotation of the shaft 154. When the shaft 154 is turned in counterclockwise direction, however, the pinion gear 159 must turn with it whereas the pinion gear 158 turns in clockwise direction oppositely to the direction of rotation of the shaft 154 via the interposed gearing. This means that the spring gear wheels 155 and 156 are always turned in counterclockwise direction or clockwise direction independently of the direction of rotation of the shaft 154, so that the spiral spring —which is located within the spring casing 157 and connected with one end with the gear 155 and with the other end with the gear 156— will always be wound from both of its ends.

As long as the reversing pinion 161 is in mesh with the gear 155 and the gear 159, the spiral spring cannot discharge energy and the drive is blocked. As soon, as the pinion 161 disengages with the teeth of one of the two gears 155 and 159, the spring can discharge energy and the reversing pinion 161 will turn in clockwise direction in the illustrated embodiment. The release for this purpose is automatic when the force P acting upon the arm 165 is released, so that the arm 163c is similarly released and will lift the pinion 161 out of engagement with the teeth of the gear 159. Because the pinion 161 remains in mesh with the gear 155 it will turn idly with the same.

Figure 13:
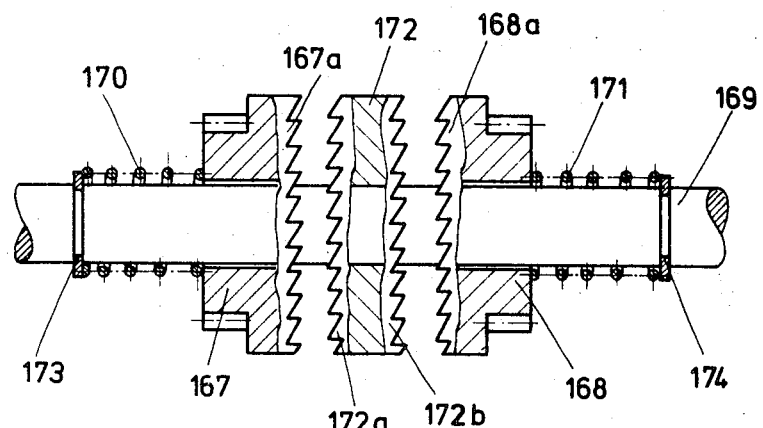
FIG. 13 is a partially sectioned top view of a one-way device according to the present invention for the novel drive in a ninth embodiment.

Coming, finally, to the embodiment illustrated in FIG. 13 it will be seen that in place of the one-way devices shown in FIGS. 12a and 12c, one-way devices such as shown in FIG. 13 can also be used. These, incidentally, are also employed in the embodiments of FIGS. 5–7, 9 and 10. In FIG. 13, also, the one-way devices are combined with two pinion gears 167 and 168 which are axially displaceable and turnably mounted on the pinion shaft 169. They are engaged by pretension springs 170 and 171 so that their blocking teeth 167a and 168a abut and mesh with the corresponding teeth 172a and 172b of the disc member 172.

With respect to FIG. 13 it is pointed out that for reasons of better illustration the pinion gears 167 and 168 are shown spaced from the disc 172. This is not actually the case. The disc member 172 is fast with the shaft 169 and the sawtooth-shaped projections of the annuli of teeth 167a and 168a —as well as of the annuli 172a and 172b of the member 172— are inclined in mutually opposite directions, so that depending upon the direction of rotation of the shaft 169 and the member 172, only one of the two gears 167 and 168 will be taken along in rotation. The gear which is blocked in the manner discussed earlier, will be displaced axially by a distance corresponding to the depth of its teeth, with one of the two springs 170 or 171 returning it subsequently against the force of such displacement. The springs 170 and 171 abut against shoulders or similar components 173 and 174 provided on the shaft 169.

It will be understood that each of the elements described above, or two or more together, may also find a useful application in other types of constructions differing from the types described above.

While the invention has been illustrated and described as embodied in a drive, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A drive, particulary for mobile toys, comprising a first component rotatable in one and in an opposite direction; a second component rotatable in a predetermined direction; energy storing means connected with said second component and adapted to store energy in response to rotation thereof in said predetermined direction; and transmission means associated with said components for effecting rotation of said second component in said predetermined direction, said transmission means comprising a first branch including first means adapted to link said components for transmission of motion from said first to said second component only in response to rotation of the former in said one direction, and a second branch including second means adapted to link said components for transmission of motion from said first to said second component only in response to rotation of the former in said opposite direction.

2. A drive as defined in claim 1, wherein said first and second components are rotary shafts.

3. A drive as defined in claim 1, wherein said energy storing means comprises a resiliently deformable element.

4. A drive as defined in claim 1, wherein said energy storing means comprises a coil spring.

5. A drive as defined in claim 1, wherein said branches comprise a plurality of components at least one of which is common to both said first and said second branch.

6. A drive as defined in claim 5, said first component being a rotary shaft; further comprising a first and a second pinion rotatably mounted on said shaft and cooperating with said first and second means, respectively, so as to be non-rotatably connected thereby with said shaft when the latter rotates in said one and said opposite direction, respectively; said one pinion meshing with one of said gear wheels when non-rotatably connected with said shaft; further comprising a direction-reversing pinion meshing with said second pinion and with the other of said gear wheels when said second pinion is non-rotatably connected with said shaft; and further comprising an output shaft driven by said output transmission and adapted to be rotated when the latter is coupled with one of said gear wheels and said spring releases stored energy.

7. A drive as defined in claim 1, said energy storing means comprising a spring having spaced ends; and wherein said second component comprises two gear wheels each of which is connected with one of said ends; said branches each cooperating with one of said gear wheels.

8. A drive as defined in claim 7; and further comprising blocking means cooperating with said gear wheels and operative for preventing turning of one of said gear wheels during turning of the other of said gear wheels, and vice versa.

9. A drive as defined in claim 8, said blocking means comprising toothed wheels and cooperating pawls each cooperating with one of said toothed wheels.

10. A drive as defined in claim 9, said pawls being elastic pawls normally out of blocking engagement with the respectively cooperating toothed wheel.

11. A drive as defined in claim 10, each of said elastic pawls further comprising a flexible arm arranged to be displaced and tensioned for engagement of the respective pawl with the cooperating toothed wheel, and for assisting subsequent disengagement of the respective pawl from such cooperating toothed wheel.

12. A drive as defined in claim 7; further comprising rotary-motion converting means cooperating with said transmission means and said gear wheels and operative for turning said gear wheels in mutually opposite directions of rotation in response to turning of said first component in said one and said opposite direction, respectively.

13. A drive as defined in claim 12, said transmission means comprising a transmission gear arranged for meshing with one of said gear wheels; and wherein said converting means comprises a reversing pinion meshing with said transmission gear and with the other of said gear wheels.

14. A drive as defined in claim 13, said reversing pinion comprising a shaft member and a pair of gear members fixed on said shaft member for rotation therewith.

15. a drive as defined in claim 14, wherein said gear members are of identical size and configuration.

16. A drive as defined in claim 14, said gear members comprising a larger and a smaller gear member; and wherein said larger gear member is laterally offset with reference to the cooperating transmission gear.

17. A drive as defined in claim 13; and further comprising mounting means mounting said reversing pinion for displacement into and out of mesh positions with reference to at least one of said transmission gear and other gear wheel.

18. A drive as defined in claim 17, said reversing pinion comprising a pinion shaft extending beyond opposite axial ends of said reversing pinion; and wherein said mounting means comprises a mounting frame having at least two transversely spaced apertures each accommodating an end portion of said pinion shaft and at least one of which is elongated in the direction in which said reversing pinion is to be displaced; and further comprising an operating member for displacing said reversing pinion in said one elongated aperture.

19. A drive as defined in claim 17, said reversing pinion comprising a pinion shaft having spaced end portions; said mounting means comprising a bifurcated mounting element engaging said end portions and carrying said reversing pinion; further comprising a support pivotably supporting said mounting element for movement between a first and a second position in which said reversing pinion is respectively in and out of mesh; and biasing means permanently urging said mounting element to said second position.

20. A drive as defined in claim 19, said gear wheels being mounted on a common axle, and said transmission gear comprising a pair of pinions which have a joint axis of rotation, an imaginary line passing through said pinion shaft and said common axle including a predetermined angle with an imaginary line passing through said pinion shaft and said joint axis of rotation; and wherein said bifurcated mounting element is pivotable about a pivot axis which is located at a side of said pinion shaft remote from said gear wheels and on a line bisecting said predetermined angle.

21. A drive as defined in claim 20, said mounting element comprising a pair of journals for said pivot shaft and at least one of which is a slot-shaped aperture; said mounting element comprising an arm provided with a projection which is slidably received in a slotted aperture of said support and so oriented with reference to said gear wheels that when said mounting element is in said second position, said reversing pinion is in said mesh position.

22. A drive as defined in claim 21, said biasing means comprising a biasing spring bearing upon said support and said projection.

23. A drive as defined in claim 21; further comprising an abutment provided in said slotted aperture and adapted to engage and support said projection when said mounting element is in said first position thereof.

24. A drive as defined in claim 17; and further comprising biasing means permanently tending to displace said reversing pinion to said out of mesh position.

25. A drive as defined in claim 7; further comprising an output transmission normally uncoupled from said gear wheels; coupling means for coupling said output transmission with one of said gear wheels when desired; and decoupling means permanently tending to decouple said output transmission from said one gear wheel.

26. A drive as defined in claim 25; further comprising detent means cooperating with one of said gear wheels for preventing turning of the same when energy stored in said spring is to be released via the other of said gear wheels.

27. A drive as defined in claim 26, said first component being a rotary shaft having end portions carrying respective vehicle wheels; further comprising a first and a second pinion rotatably mounted on said shaft and cooperating with said first and second means, respectively, so as to be non-rotatably connected thereby with said shaft when the latter rotates in said one and said opposite direction, respectively; one of said pinions being in motion-transmitting connection with one of said gear wheels; and further comprising engaging means operative for effecting motion-transmitting engagement of said pinions each with one of said gear wheels, and of one of said pinions with a reversing pinion meshing with one of said gear wheels so as to tension said spring from both of said ends thereof irrespective of the direction of rotation of said first component.

28. A drive as defined in claim 27; further comprising a first frame carrying at least said spring, said second component and said reversing pinion; a second frame carrying said rotary shaft and at least some elements of said transmission means and being pivotable relative to said first frame to a position in which said pinions engage said gear wheels and said reversing pinion and said output transmission is de-coupled from said one gear wheel; and further comprising biasing means permanently urging said second frame to a second position in which said pinions are out of engagement with said gear wheels and said output transmission is coupled with said one gear wheel.

29. A drive as defined in claim 7; further comprising an output transmission for release of energy stored by said spring and having an output shaft, a pair of pinions one of which has a number of gear teeth greater than the other and which pinions are connected for joint rotation in at least one direction; and wherein said gear wheels are of different sizes and each mesh with one of said pinions.

30. A drive as defined in claim 25, said first component being a rotary shaft; further comprising a first and a second pinion rotatably mounted on said shaft and cooperating with said first and second means, respectively, so as to be non-rotatably connected with said shaft when the latter rotates in said one and in said opposite direction, respectively; said one pinion meshing with one of said gear wheels when non-rotatably connected with said shaft; and further comprising a direction-reversing pinion meshing with said second pinion and with the other of said gear wheels when said second pinion is non-rotatably connected with said shaft.

31. A drive as defined in claim 30, said coupling means being operative for coupling one of said first and second pinions with the associated gear wheel and with said output transmission when stored energy is to be released from said spring.

32. A drive as defined in claim 1, said energy storing device comprising a spring having an end, and said second component comprising a gear wheel connected with said end; and wherein one of said branches comprises an even number of meshing gears and the other of said branches comprises an uneven number of meshing gears.

33. A drive as defined in claim 1, said energy storing means comprising a coil spring having an outer end and an inner end; a hook provided on said inner end; said second component including a spring shaft carrying said spring; and an engaging portion on said spring shaft engaging said hook and maintaining the same connected with said spring shaft when said spring is tensioned, but releasing said hook when said spring is relaxed.

34. A drive as defined in claim 1, said energy storing means comprising a casing having an inner wall, and a coil spring accommodated in said casing and having an inner end portion and an outer end portion, said outer end portion having an abutment portion adapted to frictionally engage said inner wall.

35. A drive as defined in claim 34, said outer end portion having freedom of sliding movement over said inner wall in frictional engagement therewith; and further comprising detents on said inner wall extending transversely of the direction of sliding movement of said outer end portion and adapted to engage and cooperate with said abutment portion thereon.

36. A drive as defined in claim 34, said spring having a first thickness and said outer end portion being bent back upon itself and forming a hook, said spring further comprising a spring section of second greater thickness retained in said book and extending from the same circumferentially of said coil spring, said spring section having a radially outwardly bent free end.

37. A drive as defined in claim 1, said first and second means comprising a shaft, and each comprising an annulus of sawteeth mounted freely rotatably on said shaft with the sawteeth of one annulus being inclined in opposite circumferential direction to the sawteeth of the other annulus, and each further comprising respective springy detent elements firmly fixed to said shaft and engageable with the respective annulus upon rotation of said shaft in requisite direction for effecting concomitant rotation of the thus engaged annulus in said direction.

38. A drive as defined in claim 37, said first and second means further comprising a hollow pinion mounted on said shaft, and said annuli and detent elements being provided in the interior of said hollow pinion.

* * * * *